(12) United States Patent
Sahlin et al.

(10) Patent No.: US 11,585,947 B2
(45) Date of Patent: Feb. 21, 2023

(54) MECHANISM TO TRIGGER ADAPTIVE TRANSMISSION FOR VULNERABLE ROAD USERS (VRU)

(71) Applicant: Telefonaktiebolaget LM Ericsson (publ), Stockholm (SE)

(72) Inventors: Henrik Sahlin, Mölnlycke (SE); Wanlu Sun, San Diego, CA (US); Stefano Sorrentino, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 203 days.

(21) Appl. No.: 17/056,245

(22) PCT Filed: May 17, 2019

(86) PCT No.: PCT/EP2019/062855
§ 371 (c)(1),
(2) Date: Nov. 17, 2020

(87) PCT Pub. No.: WO2019/224124
PCT Pub. Date: Nov. 28, 2019

(65) Prior Publication Data
US 2021/0215830 A1    Jul. 15, 2021

Related U.S. Application Data

(60) Provisional application No. 62/673,893, filed on May 19, 2018.

(51) Int. Cl.
*G01S 19/34* (2010.01)
*G08G 1/16* (2006.01)
(Continued)

(52) U.S. Cl.
CPC .............. *G01S 19/34* (2013.01); *G08G 1/164* (2013.01); *G08G 1/166* (2013.01); *H04W 4/40* (2018.02); *H04W 4/46* (2018.02)

(58) Field of Classification Search
CPC ......... G01S 19/34; G01S 19/48; G08G 1/164; G08G 1/166; H04W 4/40; H04W 4/46
See application file for complete search history.

(56) References Cited

U.S. PATENT DOCUMENTS

| | | | | |
|---|---|---|---|---|
| 6,768,909 B1 * | 7/2004 | Irvin | ...................... | G01S 19/48 |
| | | | | 455/456.6 |
| 7,646,338 B2 * | 1/2010 | Monnerat | ............... | G01S 19/06 |
| | | | | 342/357.73 |

(Continued)

FOREIGN PATENT DOCUMENTS

| | | | | |
|---|---|---|---|---|
| BR | 102016018517 A2 * | 4/2018 | ............. | G01S 19/34 |
| CN | 110267228 A * | 9/2019 | ............. | H04W 4/40 |
| RU | 2583987 C1 * | 5/2016 | ............. | G01S 19/34 |

OTHER PUBLICATIONS

PCT International Search Report and Written Opinion, dated Aug. 7, 2019 for International Application No. PCT/EP2019/062855, 13 pages.

(Continued)

*Primary Examiner* — Bernarr E Gregory
*Assistant Examiner* — Fred H Mull
(74) *Attorney, Agent, or Firm* — Sage Patent Group

(57) ABSTRACT

Systems, methods, devices, and computer program products are provided. Operations thereof include sending, by a first system and to a user equipment, an activation notification that activates a dangerous area and causes the user equipment to increase a reporting granularity corresponding to a location of the user equipment. The dangerous area corresponds to an area that includes a vehicle operating therein. The reporting granularity is increased relative to a first reporting granularity. Operations include receiving, from the user equipment, location reporting data that is provided at the increased granularity and sending, to a second system, a (Continued)

first notification that corresponds to determining that the Vulnerable Road User (VRU) will be in the dangerous area.

19 Claims, 22 Drawing Sheets

(51) Int. Cl.
*H04W 4/40* (2018.01)
*H04W 4/46* (2018.01)

(56) References Cited

U.S. PATENT DOCUMENTS

| | | | | |
|---|---|---|---|---|
| 2003/0191583 A1* | 10/2003 | Uhlmann | ............... | G08G 1/164 |
| | | | | 340/995.12 |
| 2004/0203853 A1* | 10/2004 | Sheynblat | ............... | G01S 19/46 |
| | | | | 455/12.1 |
| 2010/0019932 A1* | 1/2010 | Goodwin | ............... | G08G 1/162 |
| | | | | 340/902 |
| 2012/0289244 A1 | 11/2012 | Goyal | | |
| 2013/0150073 A1* | 6/2013 | Jovicic | ............... | G01S 5/021 |
| | | | | 455/456.1 |
| 2013/0158857 A1* | 6/2013 | Dutta | ............... | G01S 19/48 |
| | | | | 701/408 |
| 2013/0342402 A1* | 12/2013 | Pesonen | ............... | G01S 5/02 |
| | | | | 342/451 |

OTHER PUBLICATIONS

Ho, Ping-Fan et al., "Wi Safe: Wi-Fi Pedestrian Collision Avoidance System", IEEE Transactions On Vehicular Technology, vol. 66, No. 6, Jun. 2017, pp. 4564-4578.

ETSI, Draft ETSI TR 103 300 V0.0.8, Intelligent Transport System (ITS), Vulnerable Road Users (VRU), "Study of Use Dases and Standardisation Perspectives", Release 2, Apr. 2017, 46 pages.

* cited by examiner

SENDING A SECOND CONFIGURATION MESSAGE TO THE USER EQUIPMENT THAT CAUSES THE USER EQUIPMENT TO DEACTIVATE A PREVIOUSLY IDENTIFIED DANGEROUS AREA AND TO DECREASE A REPORTING GRANULARITY CORRESPONDING TO A LOCATION OF THE USER EQUIPMENT
500

Figure 5

SENDING, TO THE USER EQUIPMENT, THE ACTIVATION NOTIFICATION THAT ACTIVATES THE DANGEROUS AREA IS PERFORMED RESPONSIVE TO DETECTING THAT THE USER EQUIPMENT IS PROXIMATE THE DANGEROUS AREA AND THAT CONDITIONS CORRESPONDING TO ACTIVATING THE DANGEROUS AREA ARE PRESENT, WHEREIN CONDITIONS INCLUDE INFORMATION CORRESPONDING TO THE VEHICLE
600

Figure 6

SENDING, TO THE USER EQUIPMENT, PREDEFINED DANGEROUS ZONES THAT INCLUDE THE DANGEROUS AREA, WHEREIN SENDING THE PREDEFINED DANGEROUS ZONES IS PERFORMED USING LOW PRIORITY DATA TRANSFERS FOR THE USER EQUIPMENT TO PRELOAD THE PREDEFINED DANGEROUS ZONES
700

Figure 7

MECHANISM TO TRIGGER ADAPTIVE TRANSMISSION FOR VULNERABLE ROAD USERS (VRU)

RELATED APPLICATION

The present application is a 35 U.S.C. § 371 national stage application for International Application No. PCT/EP2019/062855, entitled "A MECHANISM TO TRIGGER ADAPTIVE TRANSMISSION FOR VULNERABLE ROAD USERS (VRU)", filed on May 17, 2019, which claims the benefit of and priority to U.S. Provisional Patent Application No. 62/673,893, filed May 19, 2018, the disclosure of which is hereby incorporated herein by reference in its entirety.

TECHNICAL FIELD

The present disclosure relates generally to notifying a user equipment operating in a wireless communication system to change accuracy and intensity of positioning measurements and the reporting thereof.

BACKGROUND

Vulnerable Road Users (VRUs), which includes pedestrians, wheelchair users, cyclists, motorcyclists, and so on, encompass as many as 29% of the total amount of road fatalities within the European Union (EU), which corresponds to approximately 7000 VRU fatalities per year. These large number of tragic accidents can be addressed by deploying sensors on the vehicle, by deploying road infrastructure (e.g., sensors, cameras) at dangerous locations and delivering awareness notifications to vehicles, and/or by using smartphones/sensors on a user equipment (UE) of the VRU as a connected sensor and delivering notifications to vehicles. For example, anonymization might be done between a VRU Cloud System and OEM Cloud System. The position of the VRU is reported to VRU Cloud System, such that a vehicle (VEH) can be notified of the risk of collision with the VRU 102.

A VRU with a user equipment (UE) can be tracked by using the GNSS (Global Navigation Satellite Systems) within the UE, such as GPS (Global Positioning System), GLONASS, Beidou or Galileo. This tracking of the position of the UE can be done in a VRU cloud application, such that predictions can be calculated of possible future positions of the VRU. The position of the UE then needs to be transmitted from the UE to VRU cloud application e.g. by using a cellular network such as GSM, WCDMA, LTE, NR or any other wireless communication network.

Providing the VRU Cloud System with detailed position information might drain the battery of the UE. This may be due to activation of the GPS receiver and deriving the position from received GNSS signals. Also, transmitting these positioning measurements to the network consumes energy in the UE. Moreover, the frequent transmissions of these positioning measurements to the network can easily congest the network and degrade resource utilization.

SUMMARY

According to some embodiments of inventive concepts, a method of operating a first system includes sending, to a user equipment, an activation notification that activates a dangerous area and causes the user equipment to increase a reporting granularity corresponding to a location of the user equipment, the dangerous area corresponding to an area that includes a vehicle operating therein, thus the reporting granularity is increased relative to a first reporting granularity. The method also includes receiving, from the user equipment, location reporting data that is provided at the increased granularity. The method further includes sending, to a second system, a first notification that corresponds to determining that the VRU will be in the dangerous area.

According to some other embodiments of inventive concepts, a method of operating a network node includes communicating, using a first network application, with a user equipment, to cause the user equipment to activate a dangerous area and to increase a reporting granularity corresponding to a location of the user equipment, the dangerous area corresponding to an area that includes a vehicle operating therein, the reporting granularity is increased relative to a first reporting granularity. The method of operating the network node also includes receiving, from the user equipment, location reporting data that is provided at the increased granularity. The method of operating the network node further includes communicating, between the first network application and a second network application, a first notification that corresponds to determining that the user equipment will be in the dangerous area, the second network application being configured to send a vehicle notification to the vehicle to avoid a collision.

According to some other embodiments of inventive concepts, a method of operating a user equipment, UE, that includes communicating with a first system via a radio access network. The method of operating a UE further includes increasing a frequency at which a GNSS is accessed responsive to the user equipment entering a dangerous area, the dangerous area corresponding to an area that includes a vehicle operating therein, wherein an increase in GNSS access frequency provides an increased location data.

Some embodiments are directed to a user equipment, UE, that includes a transceiver that is configured to communicate with a first system via a radio access network and a processor that is coupled to the transceiver and that is configured to perform operations including increasing a frequency at which a Global Navigation Satellite System, GNSS, is accessed responsive to the user equipment being proximate to and/or entering a dangerous area, the dangerous area corresponding to an area that includes a vehicle operating therein, wherein an increase in GNSS access frequency provides an increased location data.

Some embodiments are directed to a method of operating a user equipment, UE. The method may include operations including communicating with a first system via a radio access network, and increasing a frequency at which a Global Navigation Satellite System, GNSS, is accessed responsive to the user equipment entering a dangerous area, the dangerous area corresponding to an area that includes a vehicle operating therein, wherein an increase in GNSS access frequency provides an increased location data.

Some embodiments are directed to a method of operating a network node. The method includes operation including communicating, using a first network application, with a user equipment, to cause the user equipment to activate a dangerous area and to increase a reporting granularity corresponding to a location of the user equipment, the dangerous area corresponding to an area that includes a vehicle operating therein, the reporting granularity is increased relative to a first reporting granularity, receiving, from the user equipment, location reporting data that is provided at the increased granularity, and communicating, between the first network application and a second network application, a first notification that corresponds to determining that the user equipment will be in the dangerous area, the second network application being configured to send a vehicle notification to the vehicle to avoid a collision.

Some embodiments are directed to a first communication node that includes a network interface that is configured to communicate with a second communication node and a user equipment via an access network and a processor that is coupled to the network interface and is configured to communicate, using a first network application, with a user equipment, to cause the user equipment to activate a dangerous area and to increase a reporting granularity corresponding to a location of the user equipment, the dangerous area corresponding to an area that includes a vehicle operating therein, the reporting granularity is increased relative to a first reporting granularity, to receive, from the user equipment, location reporting data that is provided at the increased granularity, and to communicate, between the first network application and a second network application, a first notification that corresponds to determining that the user equipment will be in the dangerous area, the second network application being configured to send a vehicle notification to the vehicle to avoid a collision.

Some embodiments are directed to a method of operating a first system. Operations according to the method include sending, to a user equipment, an activation notification that activates a dangerous area and causes the user equipment to increase a reporting granularity corresponding to a location of the user equipment, the dangerous area corresponding to an area that includes a vehicle operating therein, wherein the vehicle comprises a vulnerable road user, VRU, thus the reporting granularity is increased relative to a first reporting granularity. Operations further include receiving, from the user equipment, location reporting data that is provided at the increased granularity, and sending, to a second system, a first notification that corresponds to determining that the VRU will be in the dangerous area.

Some embodiments are directed to a first communication node that includes a network interface that is configured to communicate with a second communication node and with a user equipment via one or more access networks, and a processor that is coupled to the network interface and is configured to perform any operations described herein.

Some embodiments are directed to a first communication node that includes respective modules that are adapted to perform any operations herein.

Some embodiments are directed to a user equipment, UE, that is adapted to perform any operations described herein.

Some embodiments are directed to a computer program product that includes a tangible computer readable storage medium including computer readable program code embodied in the medium that when executed by at least one processor causes the at least one processor to perform operations. Operations include communicating with a first system via a radio access network, and increasing a frequency at which a Global Navigation Satellite System, GNSS, is accessed responsive to the user equipment entering a dangerous area, the dangerous area corresponding to an area that includes a vehicle operating therein, wherein an increase in GNSS access frequency provides an increased location data.

Some embodiments are directed to a computer program product including a tangible computer readable storage medium including computer readable program code embodied in the medium that when executed by at least one processor causes the at least one processor to perform operations including communicating, using a first network application, with a user equipment, to cause the user equipment to activate a dangerous area and to increase a reporting granularity corresponding to a location of the user equipment, the dangerous area corresponding to an area that includes a vehicle operating therein, the reporting granularity is increased relative to a first reporting granularity, receiving, from the user equipment, location reporting data that is provided at the increased granularity, and communicating, between the first network application and a second network application, a first notification that corresponds to determining that the user equipment will be in the dangerous area, the second network application being configured to send a vehicle notification to the vehicle to avoid a collision.

Some embodiments are directed to a computer program product for operating a first system, including a tangible computer readable storage medium comprising computer readable program code embodied in the medium that when executed by at least one processor causes the at least one processor to perform operations including sending, to a user equipment, an activation notification that activates a dangerous area and causes the user equipment to increase a reporting granularity corresponding to a location of the user equipment, the dangerous area corresponding to an area that includes a vehicle operating therein, wherein the vehicle comprises a vulnerable road user, VRU, thus the reporting granularity is increased relative to a first reporting granularity, receiving, from the user equipment, location reporting data that is provided at the increased granularity, and sending, to a second system, a first notification that corresponds to determining that the VRU will be in the dangerous area.

By intelligently controlling the reporting granularity as discussed above, battery consumption in the UE association with the VRU may be reduced as well as a load of a communication system serving the UE.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings:

FIG. 5 is a flowchart illustrating a method of sending a second configuration messages to the user equipment in accordance with some embodiments of the inventive concepts described herein;

FIG. 6 is a flowchart illustrating a method of sending the activation notification that activates the dangerous area responsive to detecting that the user equipment is proximate to the dangerous area in accordance with some embodiments of the inventive concepts described herein;

FIG. 7 is a flowchart illustrating a method of sending, to the user equipment, predefined dangerous zones that include the dangerous area in accordance with some embodiments of the inventive concepts described herein;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
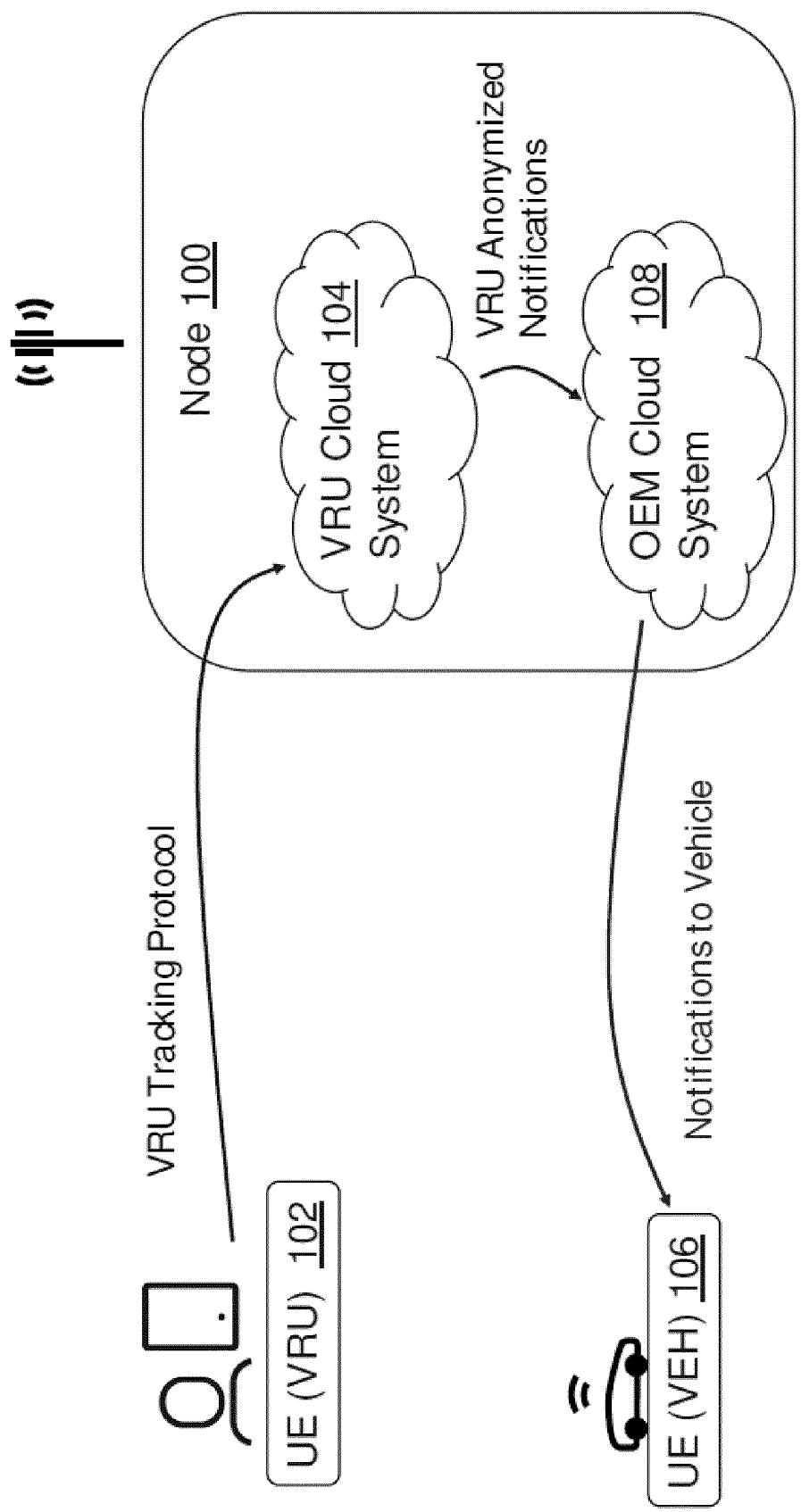
FIG. 1 is a system diagram illustrating an example first and second system in accordance with some embodiments of the inventive concepts described herein.

Vulnerable Road Users (VRUs), which includes pedestrians, wheelchair users, cyclists, motorcyclists, and so on, encompass as many as 29% of the total amount of road fatalities within the European Union (EU), which corresponds to approximately 7000 VRU fatalities per year. These large number of tragic accidents can be addressed with the following active VRU protection approaches:
1. By deploying sensors on the vehicle.
2. By deploying road infrastructure (e.g., sensors, cameras) at dangerous locations and delivering awareness notifications to vehicles.
3. By using smartphones/sensors on a user equipment (UE) 102 of the VRU as a connected sensor and delivering notifications to vehicles, for example, see illustration in FIG. 1. Here, an anonymization might be done between a VRU Cloud System 104 and OEM Cloud System 108. The position of the VRU 102 is reported to VRU Cloud System 104, such that a vehicle (VEH) 106 can be notified of the risk of collision with the VRU 102.

A VRU with a user equipment (UE) can be tracked by using the GNSS (Global Navigation Satellite Systems) within the UE, such as GPS (Global Positioning System), GLONASS, Beidou or Galileo. This tracking of the position of the UE can be done in a VRU cloud application, such that predictions can be calculated of possible future positions of the VRU. The position of the UE then need to be transmitted from the UE to VRU cloud application e.g. by using a cellular network such as GSM, WCDMA, LTE, NR or any other wireless communication network.

Providing the VRU Cloud System 104 with detailed position information might drain the battery of the UE 102. This is due to activation of the GPS receiver and deriving the position from received GNSS signals. Also, transmitting these positioning measurements to the network consumes energy in the UE 102. Moreover, the frequent transmissions of these positioning measurements to the network can easily congest the network and degrade resource utilization.

Figure 2:
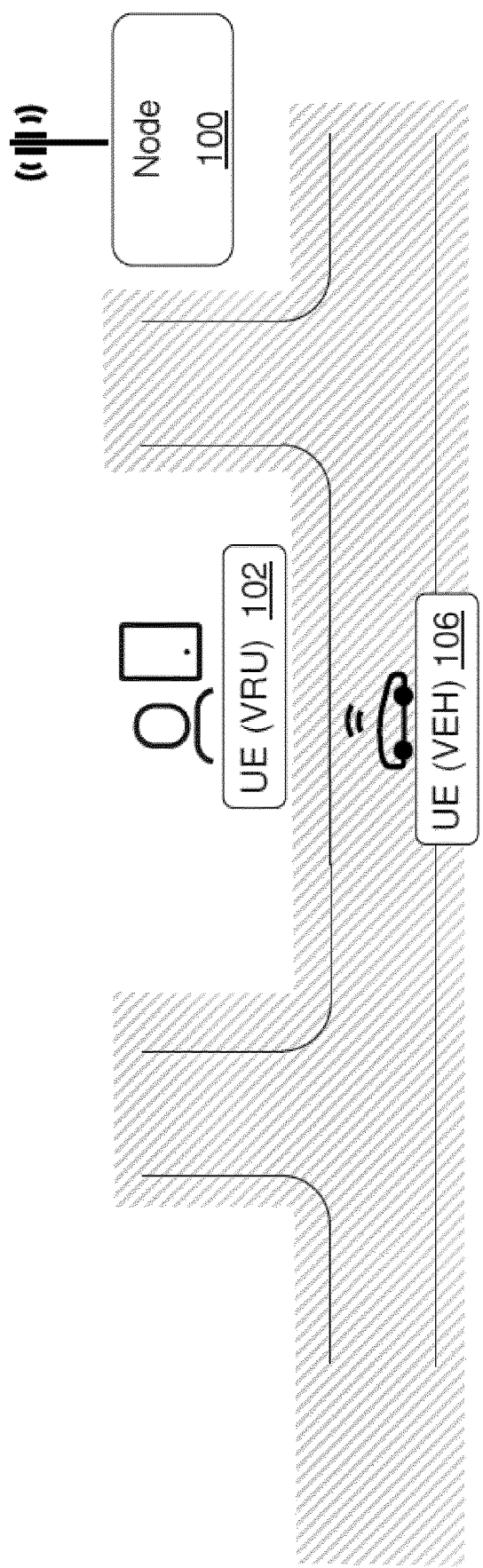
FIG. 2 illustrates an example of a dangerous area that defines a plurality of dangerous region portions in accordance with some embodiments of the inventive concepts described herein.

To reduce battery consumption and traffic load, the frequent transmissions of positioning measurements can happen only when the VRU is present at certain area, which is considered as a dangerous area or a dangerous zone. In general, a dangerous area or zone is defined wherever vehicles might be present such as roads and parking areas, for example, as illustrated FIG. 2. Typical examples of dangerous area include intersections, crossing zones, blind corner, etc. Furthermore, this dangerous area can be divided into smaller areas as a space discretized grid. Only a coarse position is needed when the VRU is outside the dangerous zone. However, this coarse position should be accurate enough such as to be able to detect whenever a VRU is entering the dangerous zone.

A coarse positioning of the VRU can be achieved by activating the GNSS on a low frequency basis. Reporting of a position from a UE 102 associated with the VRU to the VRU Cloud System 104 can be activated only when the UE 102 associated with the VRU enters a dangerous zone. In this case, a database of dangerous zones can be stored in the UE 102 associated with the VRU. This database can be updated whenever the UE 102 associated with the VRU moves between geographical areas.

Whenever a VRU is entering a dangerous zone, a more fine-grained positioning may be needed such that the vehicle 106 can take proper actions depending on the risk for collisions with the VRU. A positioning resolution of decimeter or down to centimeter is useful for reliable avoidance of collisions and at the same time avoiding a defensive managing of the vehicles. The vehicles might be fully autonomous or partly manually operated, where the driver should be given proper warnings of collision risks with VRUs in the latter case.

Since a dangerous area or zone is usually defined wherever vehicles might be present such as roads and parking areas, a substantial part of a geographical area, at least in urban areas, can be classified as dangerous zones. Furthermore, these dangerous areas should cover a significant region around the areas in which vehicles are possible. This is to get several position measurements to be used in predictions of future positions of the VRU. Also, a safety margin is needed of the position for a VRU entering a region with vehicles. This leads to unnecessarily frequent activations of GNSS and transmissions of positions from a UE 102 associated with the VRU to the VRU Cloud System 104, resulting in high battery consumption and network congestion.

Embodiments described herein generally consist of mechanisms for configuring the intensity of transmissions of positions from a VRU UE, e.g., to trigger a granularity of the positioning of the VRU UE. More specifically, the configuration of the intensity may depend on the following factors:

The status of the relevant dangerous zone, i.e., activated or deactivated, as well as the location of the VRU.

Whether the network is able to determine a good enough position based on network measurements only.

Embodiments described herein also consist of mechanisms to trigger the activation/deactivation of the dangerous zone, e.g., the dangerous zone is activated if a vehicle is inside or approaching it.

Figure 3:
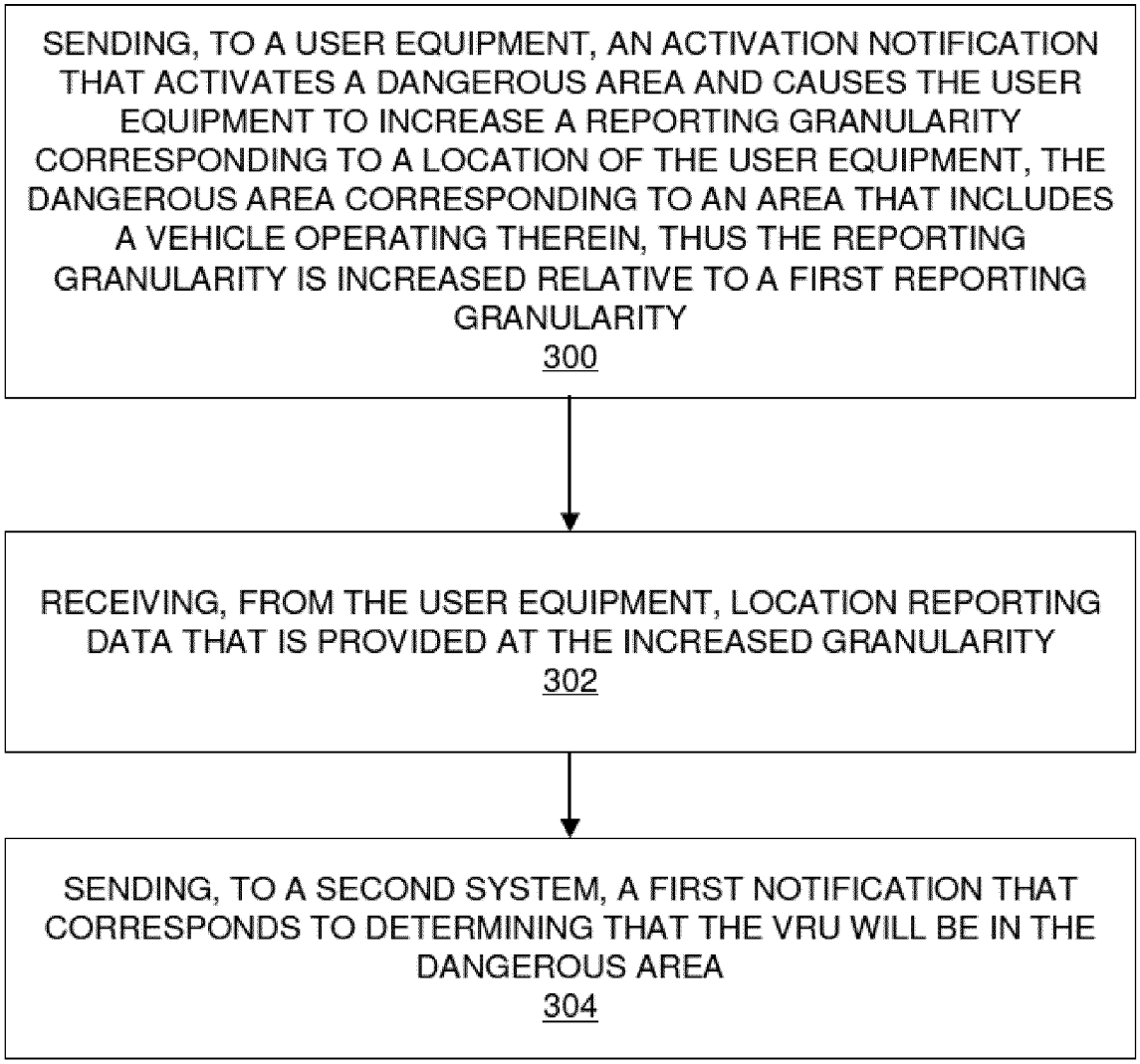
FIG. 3 is a flowchart illustrating a method of operating a first system in accordance with some embodiments of the inventive concepts described herein.

FIG. 3 illustrates a method of operating a first system in accordance with embodiments of the inventive concepts described herein. For example, FIG. 3 illustrates the method of operating the first system includes sending 302, to a user equipment, an activation notification that activates a dangerous area and causes the user equipment to increase a reporting granularity corresponding to a location of the user equipment, the dangerous area corresponding to an area that includes a vehicle operating therein, thus the reporting granularity is increased relative to a first reporting granularity. For example, FIG. 4 illustrates a VRU Cloud System 104 sends to UE VRU 102 and activation notification that activates a dangerous area (not shown) and causes the UE VRU 101 to increase a reporting granularity corresponding to a location of UE VRU 102, the dangerous area corresponding to an area that includes a vehicle UE VEH 106 operating therein.

Figure 4:
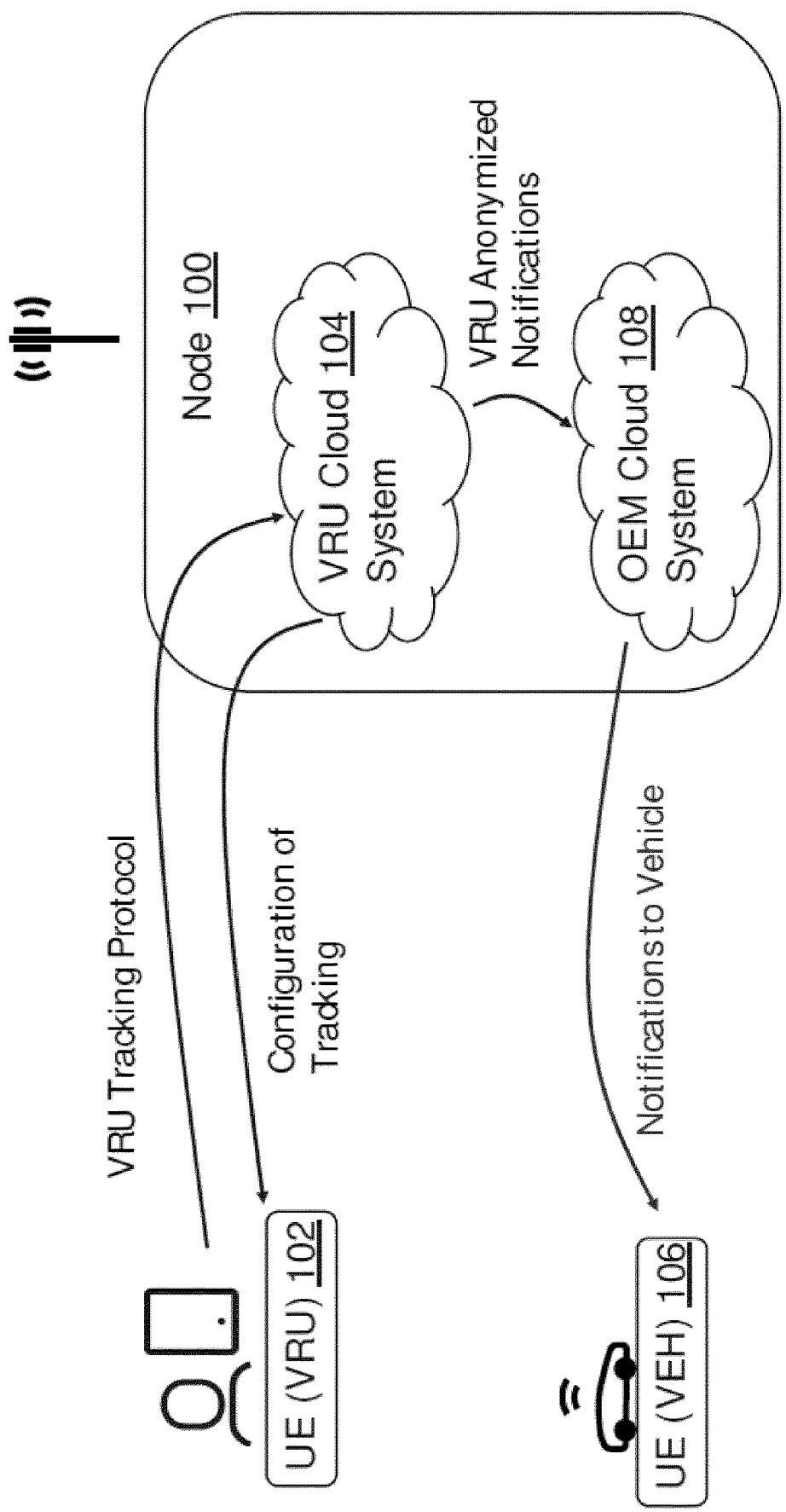
FIG. 4 is a system diagram illustrating an example first system sending, to a user equipment, an activation notification that activates a dangerous area in accordance with some embodiments of the inventive concepts described herein.

For simplicity, FIG. 4 illustrates VRU Cloud System 104 comprised in a single Node 100 of a communication network. In accordance with embodiments, the first system may comprise a single node or may be distributed across a plurality of nodes of a communication system. For example, Node 100 may comprise a node or a plurality of nodes of a Cloud-RAN (C-RAN) or a Centralized-RAN network. In another example, Node 100 may comprise one or more relay nodes, wireless gateway nodes, self-backhauled nodes, and access nodes (e.g. eNB) of a communication network.

Returning to FIG. 3, the method of operating the first system includes receiving 302, from the user equipment, location reporting data that is provided at the increased granularity. For example, FIG. 4 illustrates that VRU Cloud System 104 receives, from UE VRU 102, location reporting data that is provided at the increased granularity. FIG. 3 further illustrates that the method includes sending 304, to a second system, a first notification that corresponds to determining that the VRU will be in the dangerous area. For example, FIG. 4 illustrates VRU Cloud System 104 sends to OEM Cloud System 108 a first notification that corresponds to determining that the UE VRU 102 will be in the dangerous area.

In accordance with some embodiments, the first configuration message further causes the user equipment to increase a frequency that a global navigation satellite system, GNSS, is accessed. Also in accordance with embodiments, the network sends a configuration message to the UE 102 to activate a dangerous area. For example, if the UE 102 detects that it is close, or inside this dangerous area, then it activates the GNSS of the UE 102 in a more frequent manner and also reports its position more frequently as a "configuration of positioning reporting rate or frequency", as shown in FIG. 4. In accordance with some embodiments, the method of operating the first system may include anonymizing the first notification to remove VRU specific data therefrom, wherein an anonymized first notification is sent to the vehicle via the second system, before sending the first notification to the second system. For example, FIG. 4 illustrates that the VRU anonymized notifications are sent from VRU Cloud System 104 to OEM Cloud System 108. FIG. 4 also illustrates that the OEM Cloud System 108 then sends notifications to the relevant vehicle, such as UE VEH 106. In an alternative embodiment, the VRU Cloud System 104 can send the VRU anonymized notifications directly to the relevant vehicle(s), such as UE VEH 106.

FIG. 5 illustrates the method of operating the first system may include sending 500 a second configuration message to the user equipment that causes the user equipment to deactivate a previously identified dangerous area and to decrease a reporting granularity corresponding to a location of the user equipment. Also in accordance with embodiments, the network sends a configuration message to the UE to deactivate a dangerous area. For example, VRU Cloud System 104 of FIG. 4 may send a second configuration message to UE VEH 102 that causes UE VEH 102 to deactivate a previously identified dangerous area and to decrease a reporting granularity corresponding to a location of UE VEH 102. In accordance with some embodiments, the second configuration message further causes the user equipment to decrease a frequency that a GNSS is accessed. For example, the UE VEH 102 of FIG. 4 will activate the GNSS in a less frequent manner and report its position less frequently as a "configuration of positioning reporting rate or frequency".

Figure 8:
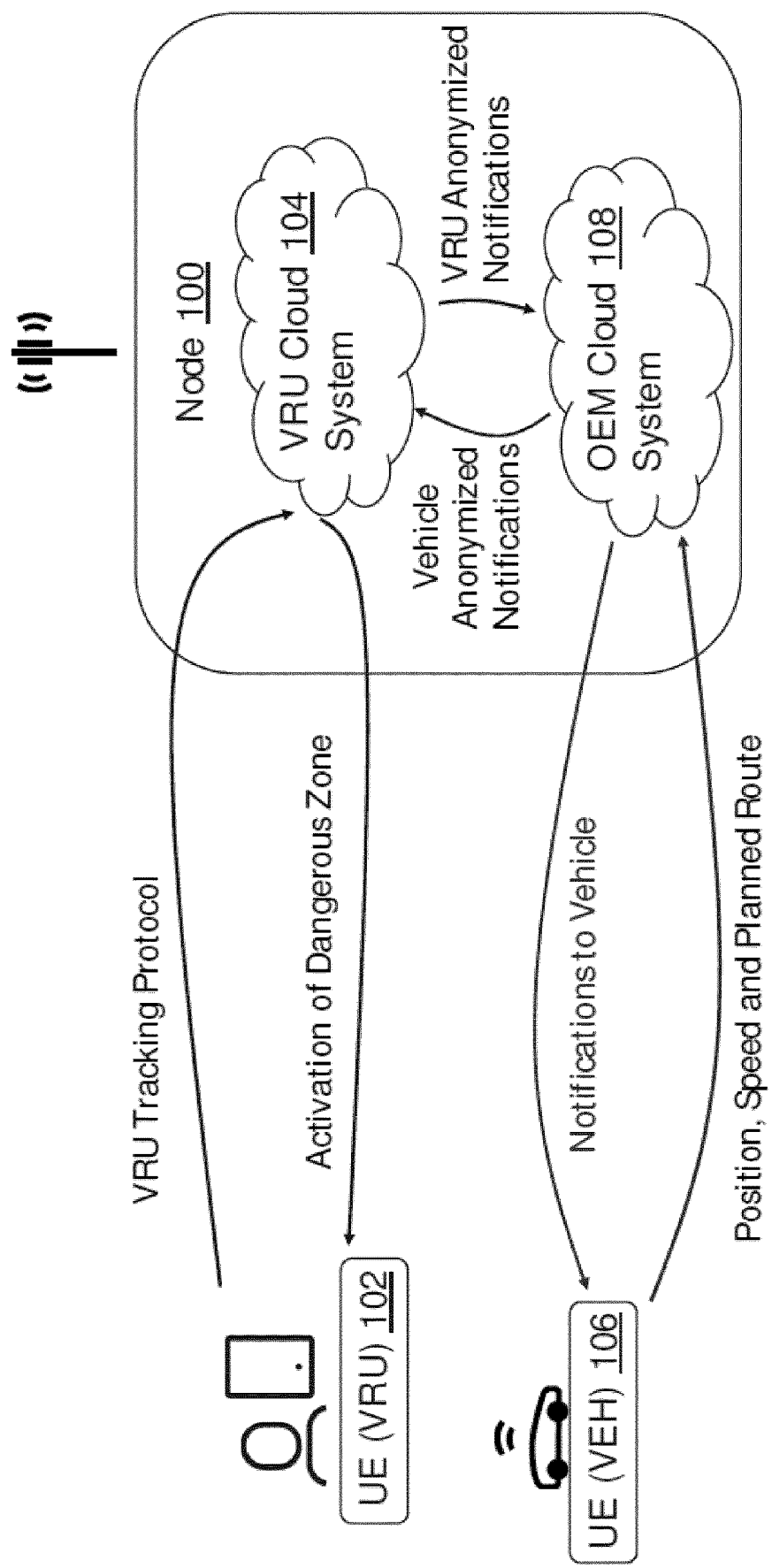
FIG. 8 is a flowchart illustrating a method of operating a network node in accordance with some embodiments of the inventive concepts described herein.

FIG. 6 illustrates the method of operating the first system may include sending 600, to the user equipment, the activation notification that activates the dangerous area is performed responsive to detecting that the user equipment is proximate the dangerous area and that conditions corresponding to activating the dangerous area are present, wherein conditions include information corresponding to the vehicle. For example, FIG. 8 illustrates VRU Cloud System 104 sending, to UE VRU 102, the activation notification that activates the dangerous area is performed responsive to detecting that the UE VRU 102 is proximate the dangerous area and that conditions corresponding to activating the dangerous area are present, wherein conditions include information corresponding to UE VEH 106. Also in accordance with some embodiments, the network decides to activate a dangerous area and it detects that a UE 102 is close, or inside this dangerous area. Then, the network sends a notification to the UE 102 so that the UE will activate the GNSS in a more frequent manner and also report its position more frequently as a "configuration of positioning reporting rate or frequency".

In accordance with some embodiments, the method of operating the first system may include sending a second configuration message to the user equipment that causes the user equipment to deactivate a previously identified dangerous area and to decrease a reporting granularity corresponding to a location of the user equipment in response to detecting that the user equipment is not proximate the dangerous area. For example, VEH Cloud System 104 of FIG. 8 may send a second configuration message to UE VRU 102 that causes the UE VRU 102 to deactivate a previously identified dangerous area and to decrease a reporting granularity corresponding to a location of the UE VRU 102 in response to detecting that the UE VRU 102 is not proximate the dangerous area. Also in accordance with some embodiments, the network decides to deactivate a dangerous area or it detects that the UE 102 is not close or inside this dangerous area. In accordance with some embodiments, the method of operating the first system may include sending a second configuration message to the user equipment that causes the user equipment to deactivate a previously identified dangerous area and to decrease a frequency that a global navigation satellite system, GNSS, is accessed responsive to receiving the first configuration message. For example, the network sends a notification to the UE 102 so that the UE 102 will activate the GNSS in a less frequent manner and also report its position less frequently as a "configuration of positioning reporting rate or frequency".

The method of operating the first system may include receiving a request for increased radio resources from the user equipment based on the user equipment entering the dangerous area in accordance with some embodiments described herein. For example, the VRU Cloud System 104 may receiving a request for increased radio resources from UE VRU 102 based on the UE VRU 102 entering the dangerous area. In accordance with embodiments, the UE triggers an activation GNSS in a more frequent manner and also reports its position more frequently, when entering an active dangerous zone. The coarse position can be measured by infrequently activations of GNSS. When more fined grained positioning is needed for a VRU, the VRU needs to send more info which leads to larger payload. In this embodiment, the UE 102 requests radio resources for a change in the rate of reporting position. In accordance with some embodiments, the radio resource comprises a larger reporting allocation and/or an increased frequency of reporting. For example, if the UE 102 enters an active dangerous area, then the UE 102 request to be allocated larger, or more frequent resources, for reporting position to VRU Cloud System 104.

In accordance with some embodiments, the location reporting data is received from the user equipment using a VRU tracking protocol. For example, FIG. 8 illustrates the VRU Cloud System 104 receiving location reporting data from UE VRU 102 using a VRU tracking protocol. Also in accordance with some embodiments, the method of operating the first system may include receiving anonymized vehicle notifications from the second system that are based on movement data corresponding to the vehicle that is received from the vehicle. For example, FIG. 8 illustrates VRU Cloud System 104 receiving anonymized vehicle notifications from OEM Cloud System 108 that are based on movement data corresponding to UE VEH 106 that is received from UE VEH 106. In accordance with some embodiments, the first configuration message includes data corresponding to the anonymized vehicle notifications.

FIG. 7 illustrates the method of operating the first system may include sending 700, to the user equipment, predefined dangerous zones that include the dangerous area, wherein sending the predefined dangerous zones is performed using low priority data transfers for the user equipment to preload the predefined dangerous zones. For example, VRU Cloud System 104 of FIG. 8 may send, to UE VRU 102, predefined dangerous zones that include the dangerous area, wherein sending the predefined dangerous zones is performed using low priority data transfers for UE VRU 102 to preload the predefined dangerous zones. In accordance with embodiments, a size of an activated portion of the predefined dangerous zones is based on a speed of the vehicle. In accordance with embodiments, the configuration of intensity of transmissions of VRU positions can be done by activating, or deactivation, of dangerous zones, as illustrated, for example, in FIG. 8. For example, FIG. 8 illustrates activation of a dangerous zone in the VRU UE 102 by the network based on position, speed and planned route of the vehicle (VEH) 106.

Figure 9:
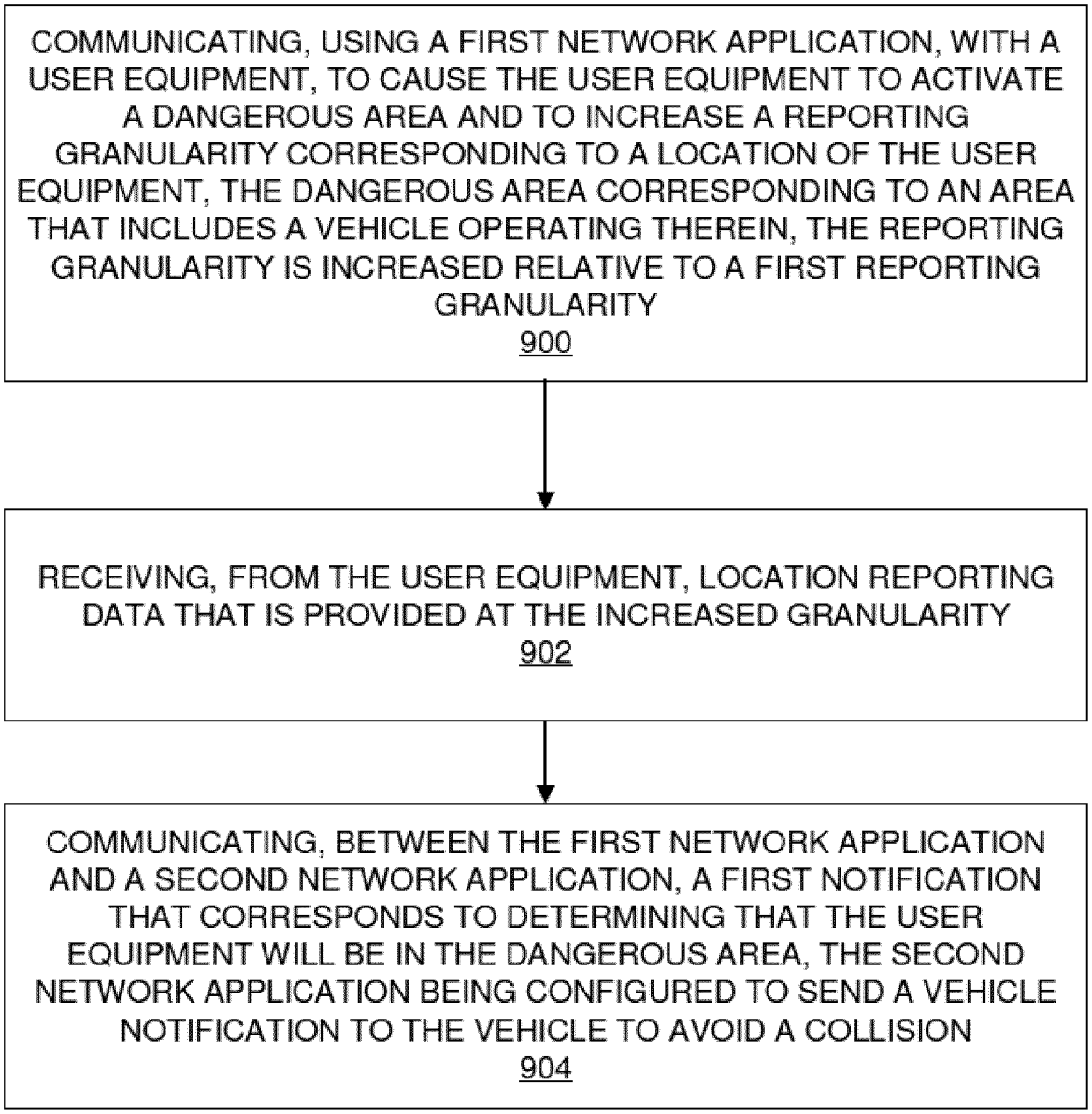
FIG. 9 is a flowchart illustrating a method of operating a user equipment in accordance with some embodiments of the inventive concepts described herein.

FIG. 9 illustrates a method of operating a network node includes communicating 900, using a first network application, with a user equipment, to cause the user equipment to activate a dangerous area and to increase a reporting granularity corresponding to a location of the user equipment, the dangerous area corresponding to an area that includes a vehicle operating therein, the reporting granularity is increased relative to a first reporting granularity. For example, the Cloud System 104 of FIG. 8 may include a first network application, such as a VRU cloud application, that communicates, to UE VRU 102, to cause the UE VRU 102 to activate a dangerous area and to increase a reporting granularity corresponding to a location of UE VRU 102, the dangerous area corresponding to an area that includes a vehicle UE VEH 106 operating therein, the reporting granularity is increased relative to a first reporting granularity.

Returning to FIG. 9, the method of operating a network also includes receiving 902, from the user equipment, location reporting data that is provided at the increased granularity. For example, the VRU Cloud System 104 of FIG. 8 may receive, from UE VRU 102, location reporting data that is provided at the increased granularity. FIG. 9 also illustrates the method of operating the network node includes communicating 904, between the first network application and a second network application, a first notification that corresponds to determining that the user equipment will be in the dangerous area, the second network application being configured to send a vehicle notification to the vehicle to avoid a collision. For example, the VRU Cloud System 104 of FIG. 8 may communicate, between VRU Cloud application and a OEM Cloud application of OEM Cloud System 108, a first notification that corresponds to determining that the UE VEH 102 will be in the dangerous area, the OEM Cloud application being configured to send a vehicle notification to the vehicle UE VEH 106 to avoid a collision.

In accordance with some embodiments, the method of operating the network node may include determining, by the first network application, coarse location data of the user equipment using network only measurements. For example, the VRU Cloud application of VRU Cloud System 104 may determine coarse location data of UE VRU 102 using network only measurements. In accordance with some embodiments, the network only measurements comprise reference signals received power measurements from surrounding communication network cells. Also in accordance with some embodiments, the network only measurements comprise beamformed reference signals from one or more base stations.

Figure 10:
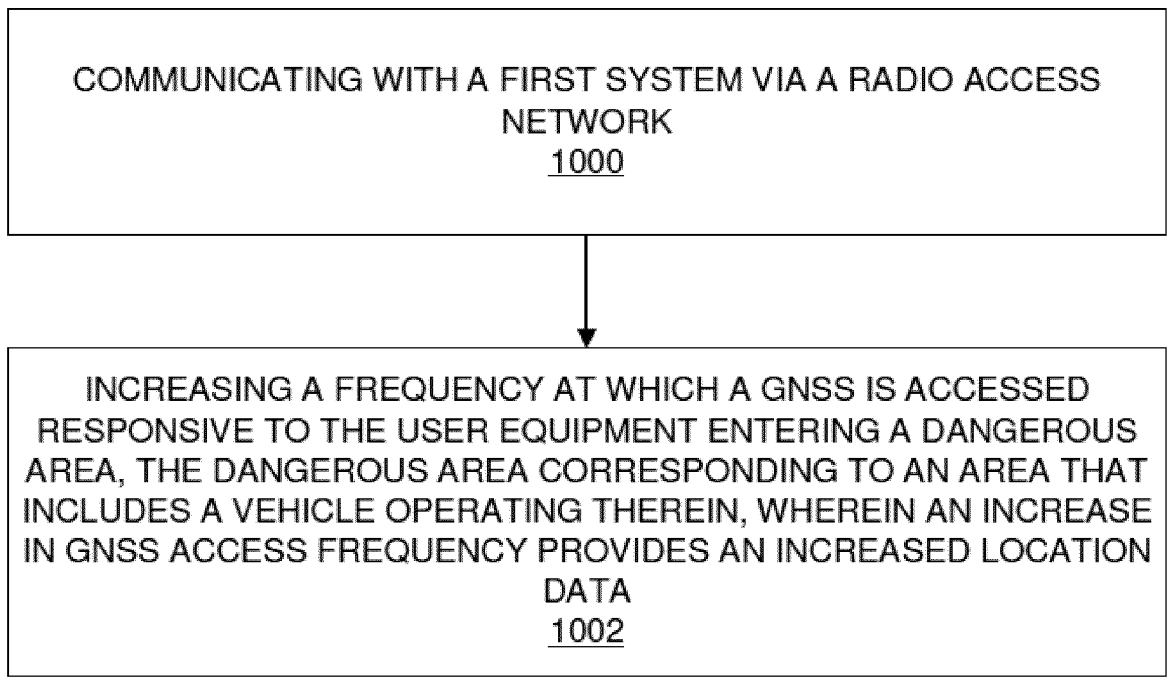
FIG. 10 is a flowchart illustrating a method of operating a user equipment to increase a frequency at which a GNNSS is accessed in accordance with some embodiments of the inventive concepts described herein.

FIG. 10 illustrates a method of operating a user equipment in accordance with the embodiments described herein. FIG. 10 illustrates the method of operating the user equipment includes communicating 1000, with a first system via a radio access network. For example, FIG. 8 illustrates the UE VEH 102 communicating with VRU Cloud System 104 via a radio access network. Returning to FIG. 10, the method of operating the user equipment includes increasing 1002 a frequency at which a GNSS is accessed responsive to the user equipment entering a dangerous area, the dangerous area corresponding to an area that includes a vehicle operating therein, wherein an increase in GNSS access frequency provides an increased location data. For example, UE VEH 102 illustrated in FIG. 8 increases a frequency at which a GNSS of UE VEH 102 is accessed responsive to UE VEH 102 entering a dangerous area, the dangerous area corresponding to an area that includes a vehicle UE VEH 106 operating therein, wherein an increase in GNSS access frequency provides an increased location data.

In accordance with some embodiments, the method of operating the user equipment may include sending, to a first system, a request for radio resources to provide the increased location data relative to data that was provided before increasing the frequency at which the GNSS was accessed. For example, the UE VEH 102 illustrated in FIG. 8 may send, to VRU Cloud System 104, a request for radio resources to provide the increased location data relative to data that was provided before increasing the frequency at which the GNSS was accessed.

Figure 11:
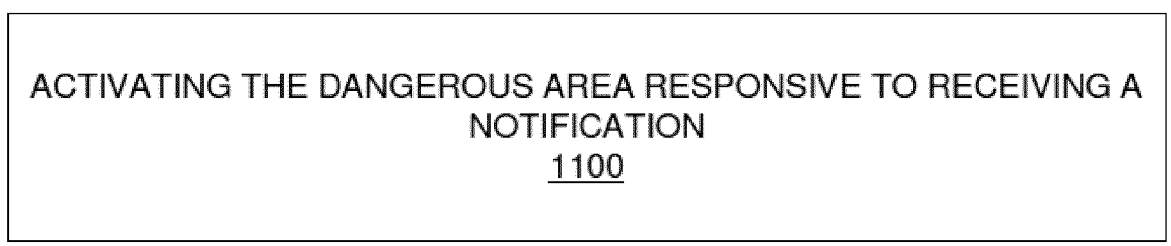
FIG. 11 is a flowchart illustrating a method of operating a user equipment to activate the dangerous area response to receiving a notification in accordance with some embodiments of the inventive concepts described herein.
Figure 14:
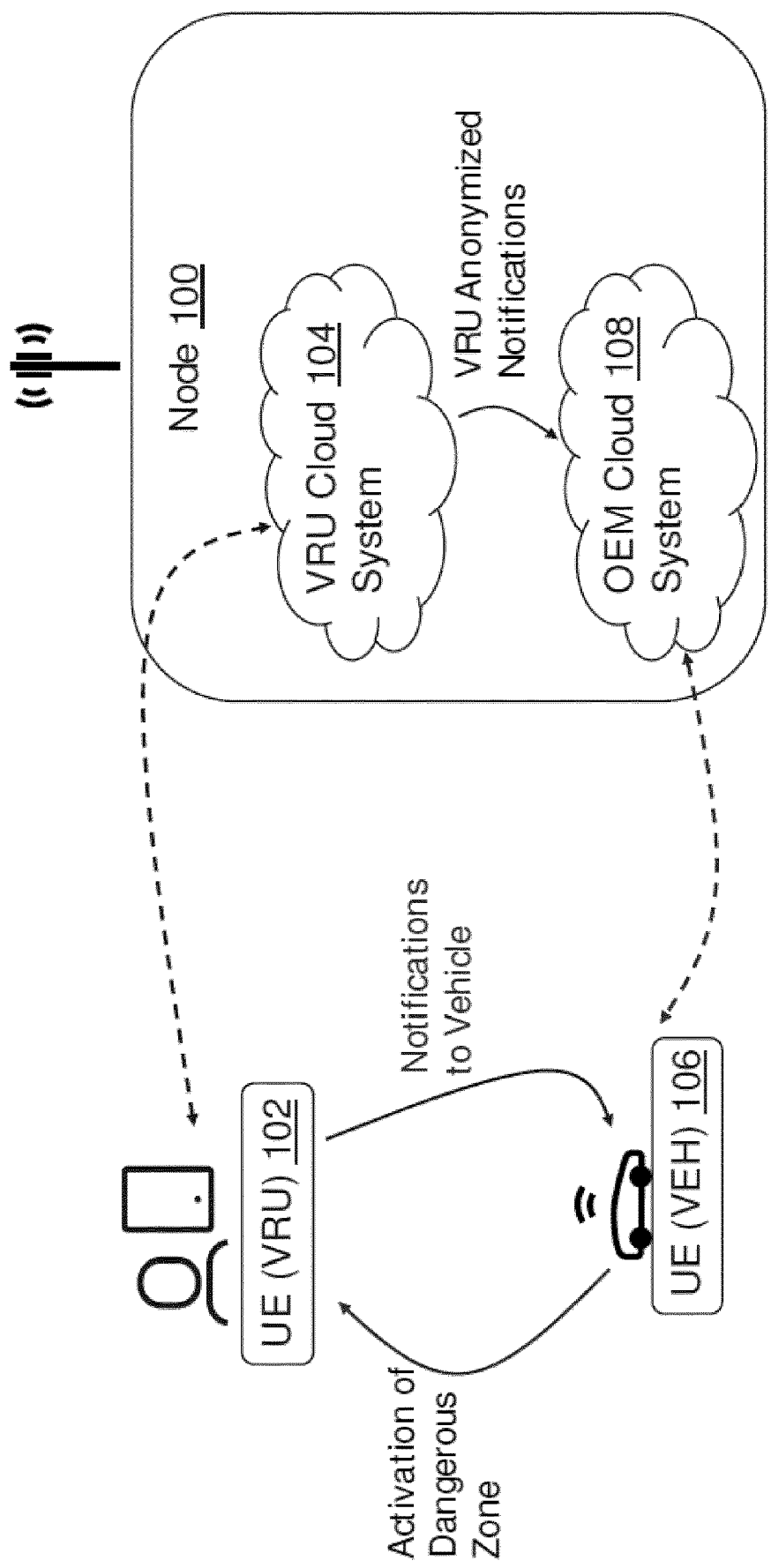
FIG. 14 is a system diagram illustrating an example user equipment receiving a notification directly from a vehicle to activate the dangerous zone in accordance with some embodiments of the inventive concepts described herein.

FIG. 11 illustrates the method of operating a user equipment may include activating 1100 the dangerous area responsive to receiving a notification. In accordance with embodiments, the notification is received from a vehicle user equipment. For example, FIG. 14 illustrates UE VRU 102 receives the notification from UE VEH 106. In accordance with other embodiments, the notification is received from the first system. As discussed in previous examples above, FIG. 8 illustrates UE VRU 102 receives the notification from VRU Cloud System 104.

Figure 12:
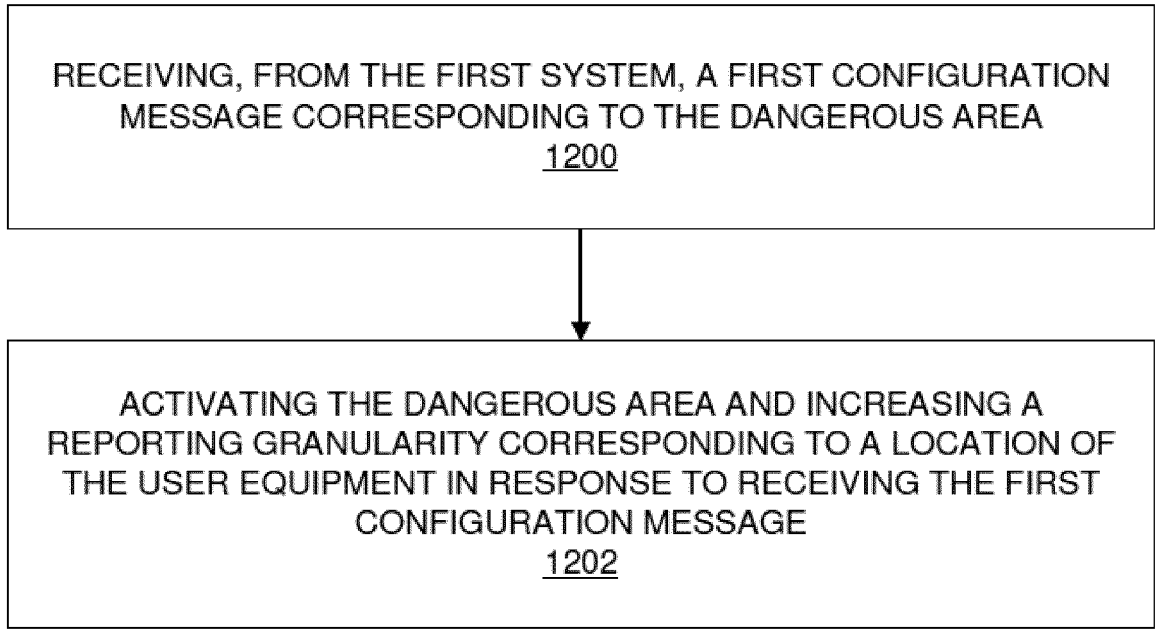
FIG. 12 is a flowchart illustrating a method of operating a user equipment to activate the dangerous area and increase a reporting granularity notification in accordance with some embodiments of the inventive concepts described herein.

FIG. 12 illustrates the method of operating the user equipment may include receiving 1200, from the first system, a first configuration message corresponding to the dangerous area. FIG. 12 also illustrates the method of operating the user equipment may include activating 1202 the dangerous area and increasing a reporting granularity corresponding to a location of the user equipment in response to receiving the first configuration message. As discussed in previous examples described above, FIG. 8 illustrates UE VRU 102 receives, from VRU Cloud System 104, a first configuration message corresponding to the dangerous area. In this example, UE VRU 102 also activates the dangerous area and increases reporting granularity corresponding to a location of UE VRU 102 in response to receiving the first configuration message. In accordance with embodiments, the method of operating the user equipment may include increasing a frequency that a global navigation satellite system, GNSS, is accessed responsive to receiving the first configuration message.

Figure 13:
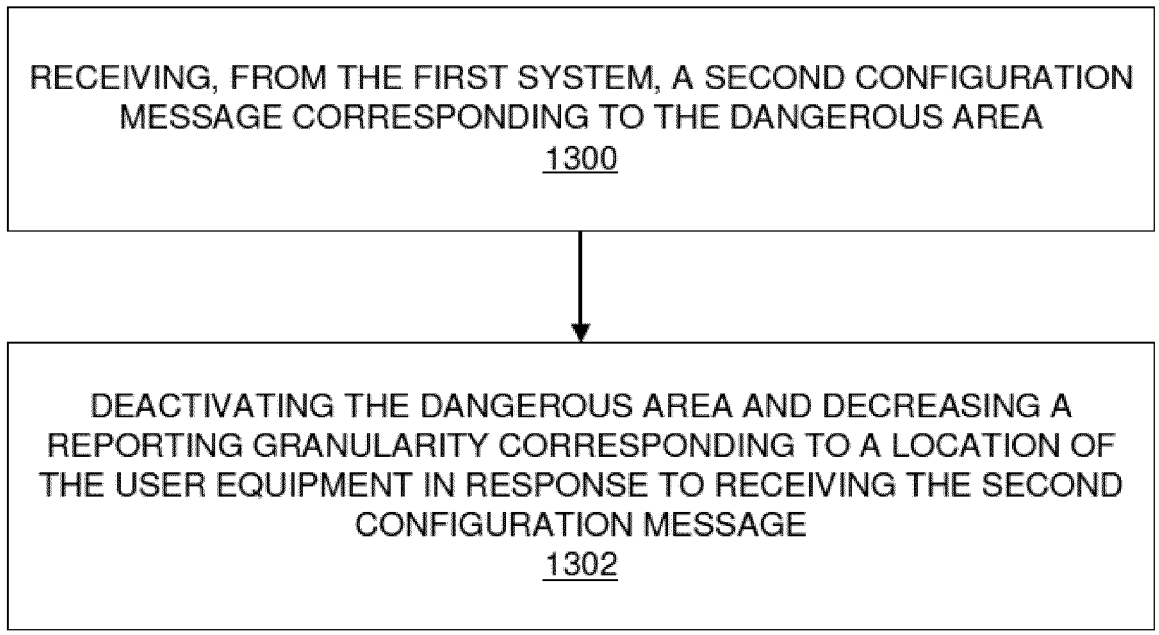
FIG. 13 is a flowchart illustrating a method of operating a user equipment to deactivate the dangerous area and decrease a reporting granularity in accordance with some embodiments of the inventive concepts described herein.

FIG. 13 also illustrates the method of operating the user equipment may include receiving 1300, from the first system, a second configuration message corresponding to the dangerous area. FIG. 13 also illustrates the method of operating the user equipment may include deactivating the dangerous area and decreasing a reporting granularity corresponding to a location of the user equipment in response to receiving the second configuration message. As discussed in previous examples described above, FIG. 8 illustrates UE VRU 102 receives, from VRU Cloud System 104, a second configuration message corresponding to the dangerous area. In this example, UE VRU 102 deactivates the dangerous area and decreases a reporting granularity corresponding to a location of UE VRU 102 in response to receiving the second configuration message. In accordance with embodiments, the method of operating the user equipment may include decreasing a frequency that a GNSS is access responsive to receiving the second configuration message.

The method of operating the user equipment may include receiving, from the first system, predefined dangerous zones that include the dangerous area, wherein receiving the predefined dangerous zones is performed using low priority data transfers for the user equipment to preload the predefined dangerous zones. As discussed in previous examples described above, FIG. 8 illustrates UE VRU 102 receives, from VRU Cloud System 104, predefined dangerous zones that include the dangerous area, wherein receiving the predefined dangerous zones is performed using low priority data transfers for UE VRU 102 to preload the predefined dangerous zones. In accordance with some embodiments, a size of an activated portion of the predefined dangerous zones is based on a speed of the vehicle.

In another embodiment of the invention, the VRU UE 102 detects that it should activate a dangerous zone. This can be done by a notification directly from a VEH UE 102 by a sidelink connection, as illustrated, for example, as discussed above, in FIG. 14.

Figure 15:
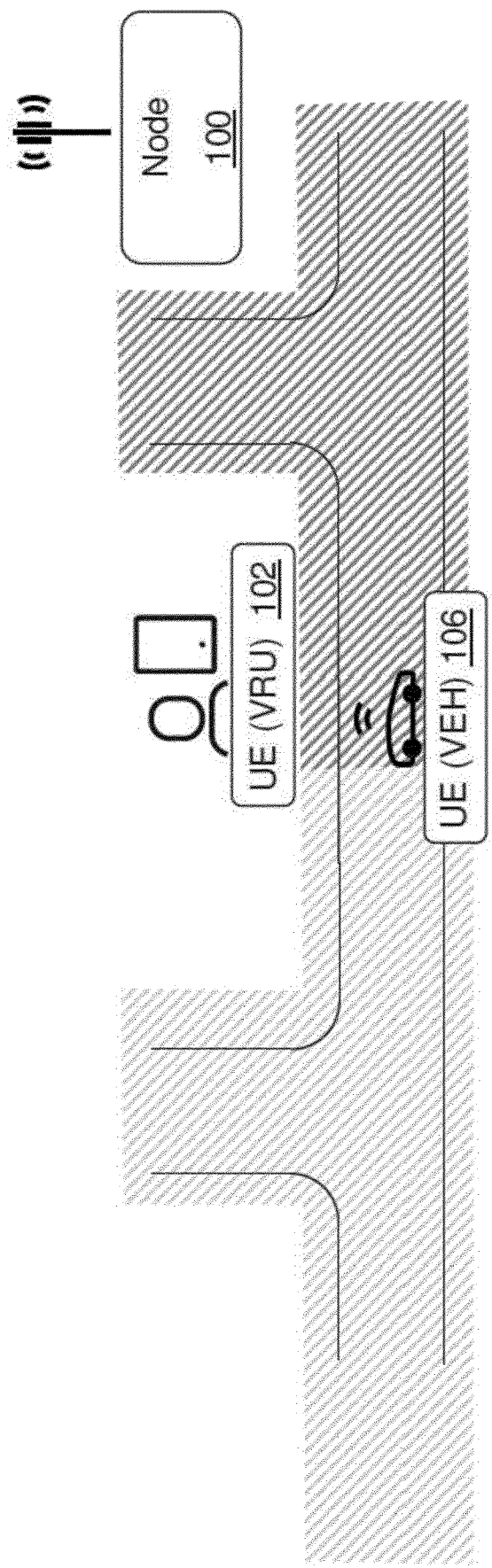
FIG. 15 illustrates an example of an activated dangerous area in accordance with some embodiments of the inventive concepts described herein.

In accordance with embodiments, dangerous areas or zones can be predefined, where these zones correspond to areas in which a vehicle might be present. An "active dangerous area" is activated if a vehicle is present in within, or is approaching, a specific dangerous zone, as shown, for example, in FIG. 15. For example, roads and the near vicinity of the roads with a vehicle inside or approaching are marked as an "active dangerous zone", as shown in FIG. 15. As discussed above, these predefined dangerous zones can be downloaded to the VRU UE 102 as low priority data transfers and/or preloaded into the VRU UE 102 for a large area around its current position. In this case the position, and possible speed, of the vehicle must be known by the VRU Cloud System, as shown, for example, in FIG. 8. In some embodiments, anonymization this information might be done between OEM Cloud System 108 and a VRU Cloud System 104.

In some embodiments, the size of the "active dangerous zone" is changed depending on the speed of the vehicle. For example, a parked vehicle, with zero speed, can have a dangerous zone only within one or a few meters surrounding the vehicle. The size of the dangerous zone is the increased in the front direction of the vehicle by the speed if the vehicle is moving forward.

Figure 16:
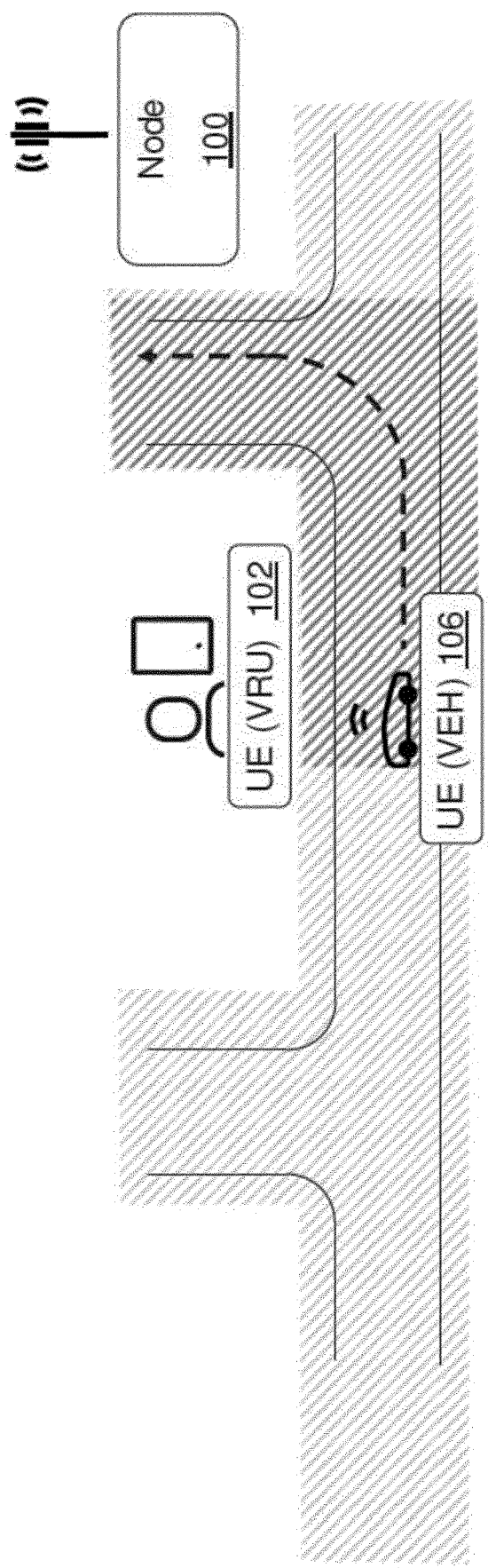
FIG. 16 illustrates an example of a planned route of a vehicle in the activated dangerous area in accordance with some embodiments of the inventive concepts described herein.

In accordance with some embodiments, a dangerous zone is activated only in those areas which the vehicle is known to be entering, as illustrated, for example, in FIG. 16. For example, Roads and the near vicinity of the roads where the vehicle is planning its route is marked as an "active dangerous zone", as shown in FIG. 16. This knowledge can be based on planned route of an autonomous car. In this case any, or all, of the position, speed and planned route must be known by the VRU Cloud System 104, as shown, for example, in FIG. 8. In some embodiments, anonymization this information might also be done between OEM Cloud System 108 and a VRU Cloud System 104.

Figure 17:
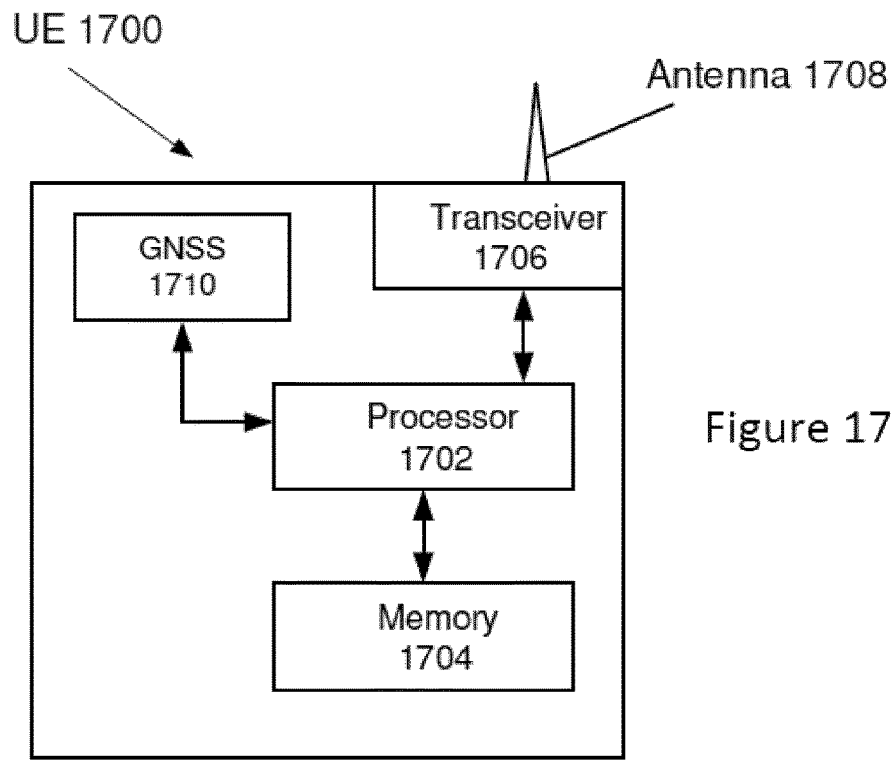
FIG. 17 is a block diagram of components of an example user equipment according to some embodiments of inventive concepts described herein.

FIG. 17 illustrates a block diagram of an example user equipment UE 1700 in accordance with embodiments of the inventive concepts described herein. FIG. 17 illustrates the UE 1700 comprises a processor 1702 that is coupled to a memory 1704 and a transceiver 1706 to communicate to a first system via a radio access network as described herein. FIG. 17 also illustrates transceiver 1706 is coupled to antenna 1708 to enable the UE 1700 to communicate with the radio access network. In accordance with embodiments, processor 1702 is configured to perform operations of UE VRU 102 as described above. Also in accordance with embodiments, processor 1702 may comprise a hardware processor, such as, but not limited to, a microprocessor, field programmable gate array (FPGA), and an application specific integrated 7 circuit (ASIC). In accordance with embodiments, processor 1702 may comprise processing circuitry configured to perform the operations described herein. FIG. 16 also illustrates the UE 1700 comprises global navigation satellite system, GNSS, circuitry 1710 configured to communicate with a GNSS in accordance with embodiment as described herein.

Figure 18:
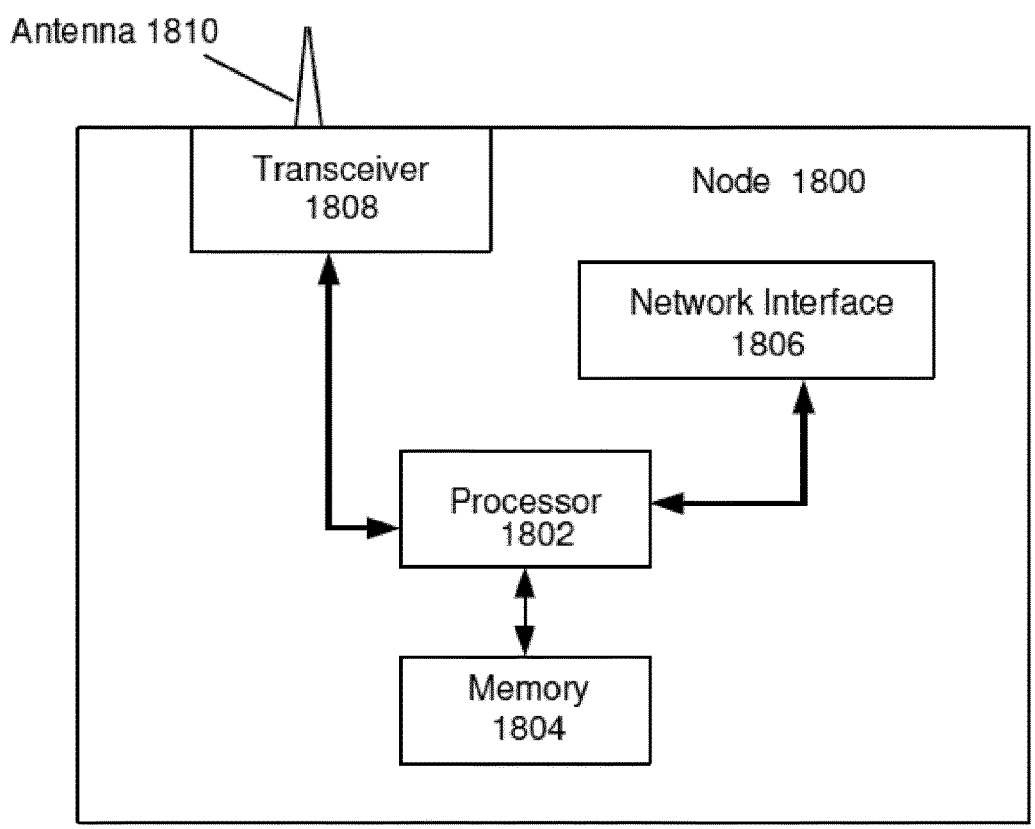
FIG. 18 is a block diagram of an example node according to some embodiments of inventive concepts described herein.

FIG. 18 illustrates a block diagram of an example node 1800 in accordance with embodiments of the inventive concepts described herein. FIG. 18 illustrates the node 1800 comprises a processor 1802 that is coupled to a memory 1804 and a network interface 1806 to communicate with a second communication node and a VRU user equipment via an access network. In some embodiments, node 1800 comprises a transceiver 1808 coupled to antenna 1810 to communicate with the VRU user equipment over an air interface. In accordance with embodiments, processor 1802 is configured to perform operations of Node 100 of either VRU Cloud System 104 or OEM Cloud System 108, or in combination as described above. Also in accordance with embodiments, processor 1802 may comprise a hardware processor, such as, but not limited to, a microprocessor, field programmable gate array (FPGA), and an application specific integrated circuit (ASIC). In accordance with embodiments, processor 1802 may comprise processing circuitry configured to perform the operations described herein.

As mentioned previously, the VRU Cloud System 104 may not able to determine the position of the VRU UE 102 with enough accuracy. In this embodiment, the VRU Cloud System 104 configures the VRU UE 102 to more frequently take measurements of position, or to average the measurements over a longer time interval, as discussed above. In one embodiment, the coarse positioning is measured by infrequent measurements by using a GNSS system in the VRU UE 102. An inaccurate coarse positioning can be due to that the GNSS is not providing enough accuracy, or too few reports from the VRU UE 102. In another embodiment, the coarse position is derived by network only measurements. One such example is RSRP (Reference Signal Received Power) measurements from surrounding cells, as commonly used for handover decisions by the network. Another alternative is triangularization of uplink transmissions from one VRU UE 102 which is received in several base stations, where each base station measures propagation delays of received signals. Yet another alternative is to determine the coarse positioning from measurements of beamformed reference signals from the base stations, such as defined for New Radio (NR), where the directions and positions can be known of the beams in which these beamformed reference signals are transmitted.

Example embodiments of inventive concepts are set forth below.

1. A method of operating a first system, the method comprising:

sending, to a user equipment, an activation notification that activates a dangerous area and causes the user equipment to increase a reporting granularity corresponding to a location of the user equipment, the dangerous area corresponding to an area that includes a vehicle operating therein, thus the reporting granularity is increased relative to a first reporting granularity;

receiving, from the user equipment, location reporting data that is provided at the increased granularity; and sending, to a second system, a first notification that corresponds to determining that the VRU will be in the dangerous area.

2. The method of Embodiment 1, further comprising, before sending the first notification to the second system, anonymizing the first notification to remove VRU specific data therefrom, wherein an anonymized first notification is sent to the vehicle via the second system.

3. The method of any of Embodiments 1-3, further comprising sending a second configuration message to the user equipment that causes the user equipment to deactivate a previously identified dangerous area and to decrease a reporting granularity corresponding to a location of the user equipment.

4. The method of any of Embodiments 1-3, wherein the first configuration message further causes the user equipment to increase a frequency that a global navigation satellite system, GNSS, is accessed.

5. The method of Embodiment 3, wherein the second configuration message further causes the user equipment to decrease a frequency that a GNSS is accessed.

6. The method of Embodiment 1, wherein sending, to the user equipment, the activation notification that activates the dangerous area is performed responsive to detecting that the user equipment is proximate the dangerous area and that conditions corresponding to activating the dangerous area are present, wherein conditions include information corresponding to the vehicle.

7. The method of Embodiment 1, further comprising sending a second configuration message to the user equipment that causes the user equipment to deactivate a previously identified dangerous area and to decrease a reporting granularity corresponding to a location of the user equipment in response to detecting that the user equipment is not proximate the dangerous area.

8. The method of any of Embodiments 1-7, further comprising receiving a request for increased radio resources from the user equipment based on the user equipment entering the dangerous area.

9. The method of Embodiment 8, wherein the radio resource comprises a larger reporting allocation and/or an increased frequency of reporting.

10. The method of Embodiment 1, further comprising sending a second configuration message to the user equipment that causes the user equipment to deactivate a previously identified dangerous area and to decrease a frequency that a global navigation satellite system, GNSS, is accessed responsive to receiving the first configuration message 11. The method of any of Embodiments 1-10, wherein the location reporting data is received from the user equipment using a VRU tracking protocol.

12. The method of any of Embodiments 1-11, further comprising receiving anonymized vehicle notifications from the second system that are based on movement data corresponding to the vehicle that is received from the vehicle.

13. The method of Embodiment 12, wherein the first configuration message includes data corresponding to the anonymized vehicle notifications.

14. The method of any of Embodiments 1-13, further comprising sending, to the user equipment, predefined dangerous zones that include the dangerous area, wherein sending the predefined dangerous zones is performed using low priority data transfers for the user equipment to preload the predefined dangerous zones.

15. The method of Embodiment 14, wherein a size of an activated portion of the predefined dangerous zones is based on a speed of the vehicle.

16. A first communication node comprising:
a network interface that is configured to communicate with a second communication node and with a user equipment via one or more access networks; and
a processor that is coupled to the network interface and is configured to perform operations of any of Embodiments 1-15.

17. A first communication node comprising respective modules that are adapted to perform according to any of Embodiments 1-15.

18. A user equipment, UE, adapted to perform according to any of Embodiments 1-15.

19. A user equipment, UE, comprising:
a transceiver that is configured to communicate with a first system via a radio access network; and
a processor that is coupled to the transceiver and that is configured to perform operations comprising:
increasing a frequency at which a GNSS is accessed responsive to the user equipment being proximate to and/or entering a dangerous area, the dangerous area corresponding to an area that includes a vehicle operating therein, wherein an increase in GNSS access frequency provides an increased location data.

20. The user equipment of Embodiment 19, further comprising sending, to the first system, a request for radio resources to provide the increased location data relative to data that was provided before increasing the frequency at which the GNSS was accessed.

21. The user equipment of any of Embodiments 19-20, further comprising activating the dangerous area responsive to receiving a notification.

22. The user equipment of Embodiment 21, wherein the notification is received from a vehicle user equipment.

23. The user equipment of Embodiment 21, wherein the notification is received from the first system.

24. The user equipment of any of Embodiments 19-23, further comprising:
receiving, from the first system, a first configuration message corresponding to the dangerous area; and
activating the dangerous area and increasing a reporting granularity corresponding to a location of the user equipment in response to receiving the first configuration message.

25. The user equipment of any of Embodiments 19-24, further comprising:
receiving, from the first system, a second configuration message corresponding to the dangerous area;
deactivating the dangerous area and decreasing a reporting granularity corresponding to a location of the user equipment in response to receiving the second configuration message.

26. The user equipment of any of Embodiments 19-25, further comprising increasing a frequency that a global navigation satellite system, GNSS, is accessed responsive to receiving the first configuration message.

27. The user equipment of Embodiment 25, further comprising decreasing a frequency that a GNSS is accessed responsive to receiving the second configuration message.

28. The user equipment of any of Embodiments 19-27, further comprising receiving, from the first system, predefined dangerous zones that include the dangerous area, wherein receiving the predefined dangerous zones is performed using low priority data transfers for the user equipment to preload the predefined dangerous zones.

29. The user equipment of Embodiment 28, wherein a size of an activated portion of the predefined dangerous zones is based on a speed of the vehicle.

30. A method of operating a network node, the method comprising:
communicating, using a first network application, with a user equipment, to cause the user equipment to activate a dangerous area and to increase a reporting granularity corresponding to a location of the user equipment, the dangerous area corresponding to an area that includes a vehicle operating therein, the reporting granularity is increased relative to a first reporting granularity;
receiving, from the user equipment, location reporting data that is provided at the increased granularity; and
communicating, between the first network application and a second network application, a first notification that corresponds to determining that the user equipment will be in the dangerous area, the second network application being configured to send a vehicle notification to the vehicle to avoid a collision.

31. The method of Embodiment 30, further comprising determining, by the first network application, coarse location data of the user equipment using network only measurements.

32. The method of Embodiment 31, wherein the network only measurements comprise reference signal received power measurements from surrounding communication network cells.

33. The method of Embodiment 31, wherein the network only measurements comprise beamformed reference signals from one or more base stations.

34. A first communication node comprising:
a network interface that is configured to communicate with a second communication node and a user equipment via an access network; and a processor that is coupled to the network interface and is configured to perform operations of any of Embodiments 30-33.

35. A method of operating a user equipment, UE, the method comprising:

communicating with a first system via a radio access network; and increasing a frequency at which a GNSS is accessed responsive to the user equipment entering a dangerous area, the dangerous area corresponding to an area that includes a vehicle operating therein, wherein an increase in GNSS access frequency provides an increased location data.

36. The method of Embodiment 35, further comprising sending, to a first system, a request for radio resources to provide the increased location data relative to data that was provided before increasing the frequency at which the GNSS was accessed.

37. The method of any of Embodiments 35-36, further comprising activating the dangerous area responsive to receiving a notification.

38. The method of Embodiment 37, wherein the notification is received from a vehicle user equipment.

39. The method of Embodiment 37, wherein the notification is received from the first system.

40. The method of any of Embodiments 35-39, further comprising:

receiving, from the first system, a first configuration message corresponding to the dangerous area; and activating the dangerous area and increasing a reporting granularity corresponding to a location of the user equipment in response to receiving the first configuration message.

41. The method of any of Embodiments 35-40, further comprising:

receiving, from the first system, a second configuration message corresponding to the dangerous area;

deactivating the dangerous area and decreasing a reporting granularity corresponding to a location of the user equipment in response to receiving the second configuration message.

42. The method of any of Embodiments 35-41, further comprising increasing a frequency that a global navigation satellite system, GNSS, is accessed responsive to receiving the first configuration message.

43. The method of Embodiment 42, further comprising decreasing a frequency that a GNSS is accessed responsive to receiving the second configuration message.

44. The method of any of Embodiments 35-43, further comprising receiving, from the first system, predefined dangerous zones that include the dangerous area, wherein receiving the predefined dangerous zones is performed using low priority data transfers for the user equipment to preload the predefined dangerous zones.

45. The method of Embodiment 44, wherein a size of an activated portion of the predefined dangerous zones is based on a speed of the vehicle.

Explanations for abbreviations from the above disclosure are provided below.

| Abbreviation | Explanation |
|---|---|
| BI | Backoff Indicator |
| CE | Coverage Enhancement |
| DL | DownLink |
| EDT | Early Data Transmission |
| eMTC | Enhanced Machine Type Communication |
| FDD | Frequency Division Duplex |
| IoT | Internet of Things |
| LTE | Long Term Evolution |
| MAC | Medium Access Control |
| MTC | Machine Type Communication |
| NB | Narrow Band |
| NW | Network |
| PDU | Protocol Data Unit |
| PRACH | Preamble Random Access Channel |
| PRB | Physical Resource Block |
| RA | Random Access |
| RAR | Random Access Response |
| RRC | Radio Resource Control |
| TBS | Transport Block Size |
| UE | User Equipment |
| UL | UpLink |
| UP | User Plane |
| GNSS | Global Navigation Satellite Systems |
| GPS | Global Positioning System |
| LTE | Long-Term Evolution |
| NR | New Radio |
| OEM | Original Equipment Manufacturer |
| VRU | Vulnerable Road User |

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 19:
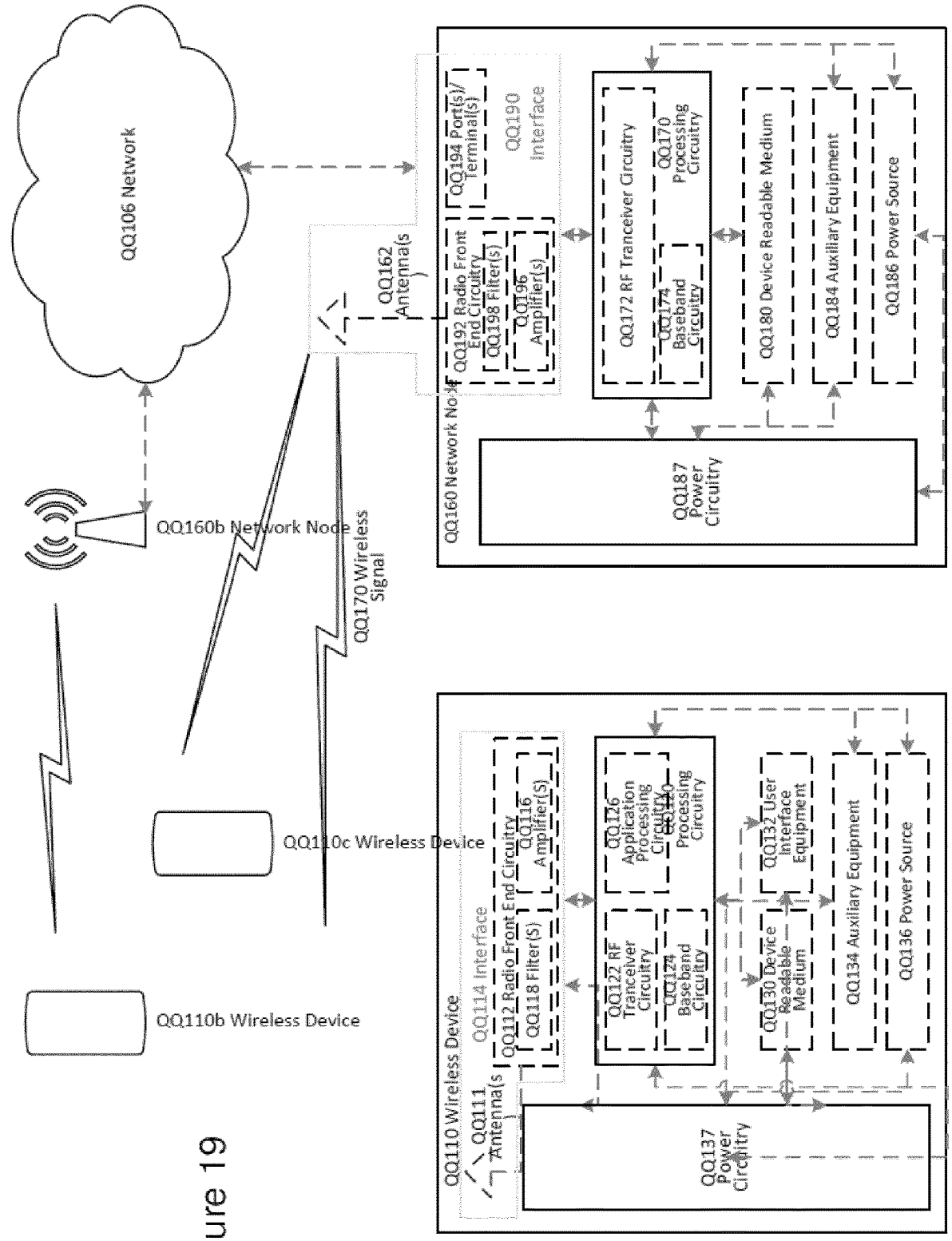
FIG. 19 is a block diagram of a wireless network in accordance with some embodiments.

FIG. 19: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 19. For simplicity, the wireless network of FIG. 19 only depicts network QQ106, network nodes QQ160 and QQ160*b*, and WDs QQ110, QQ110*b*, and QQ110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 19, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 19 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186.

Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 19 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated. User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 20:
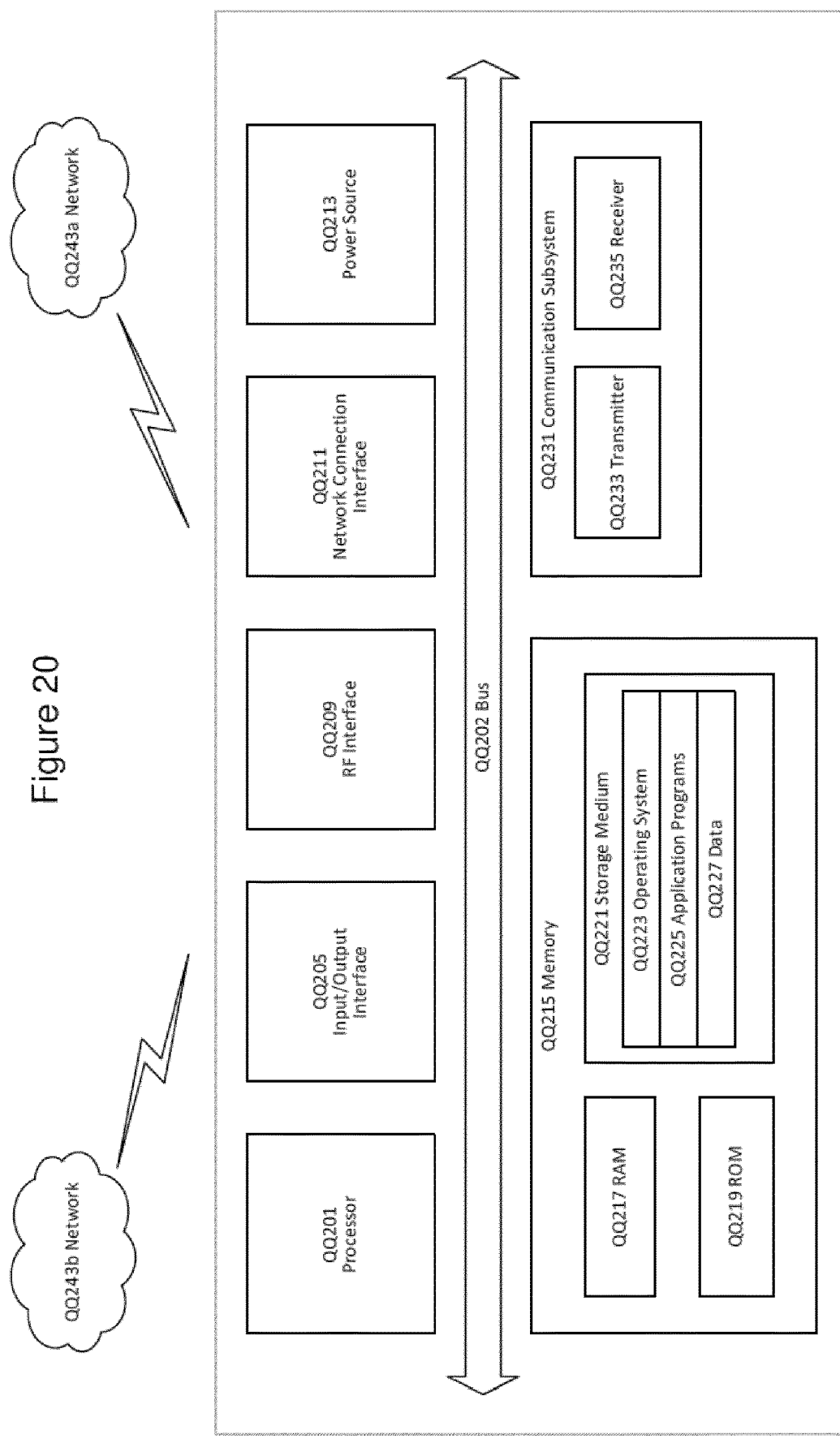
FIG. 20 is a block diagram of a user equipment in accordance with some embodiments

FIG. 20: User Equipment in accordance with some embodiments

FIG. 20 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 20, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 20 is a UE, the components discussed herein are equally applicable to a WD, and vice-versa.

In FIG. 20, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 20, or only a subset of the components. The level of integration between the components may vary from one UE to another UE. Further, certain UEs may contain multiple instances of a component, such as multiple processors, memories, transceivers, transmitters, receivers, etc.

In FIG. 20, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 20, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 20, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 21:
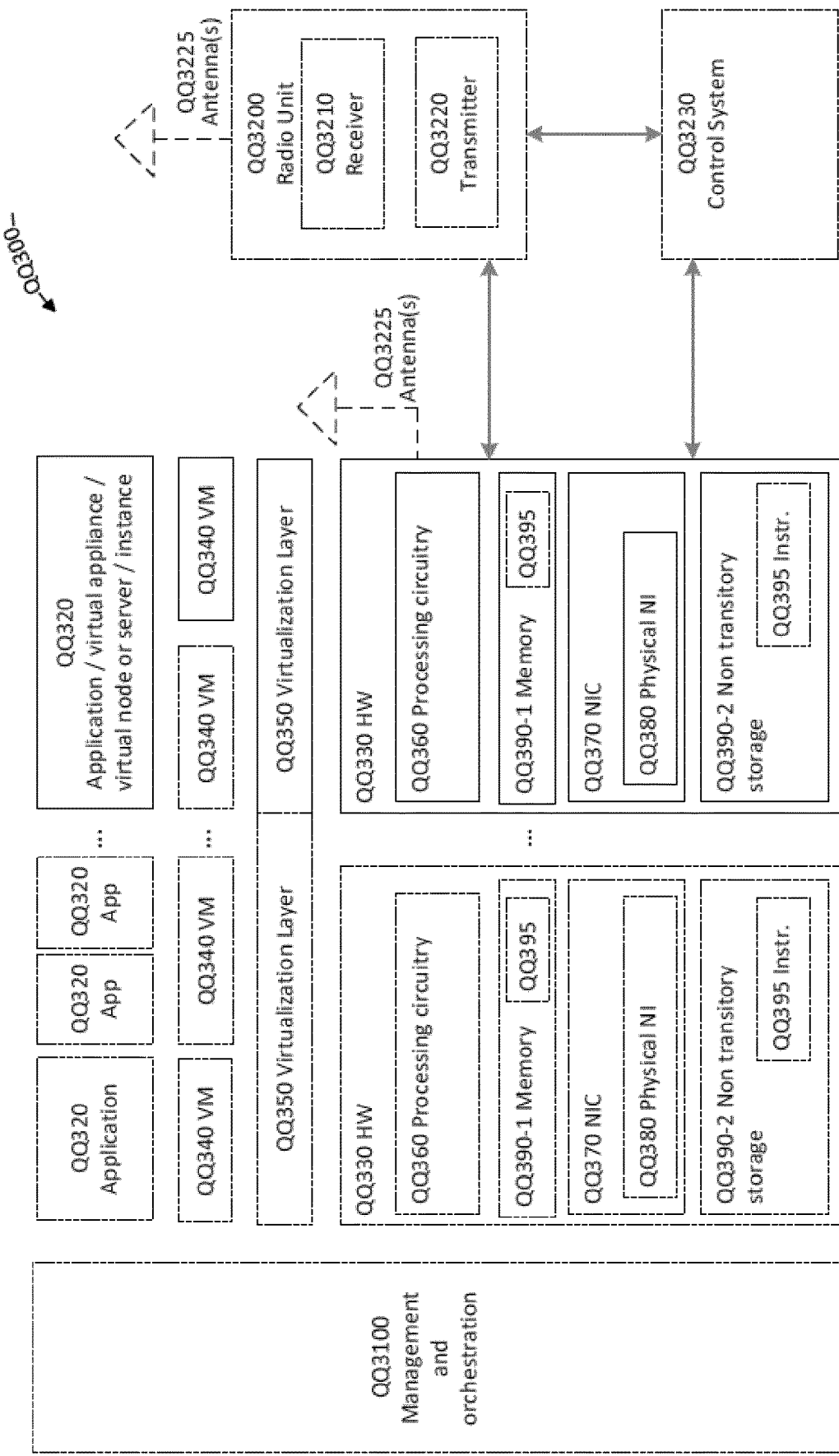
FIG. 21 is a block diagram of a virtualization environment in accordance with some embodiments.

FIG. 21: Virtualization environment in accordance with some embodiments

FIG. 21 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 21, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 21.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signaling can be effected with the use of control system QQ3230 which may alternatively be used for communication between the hardware nodes QQ330 and radio units QQ3200.

Figure 22:
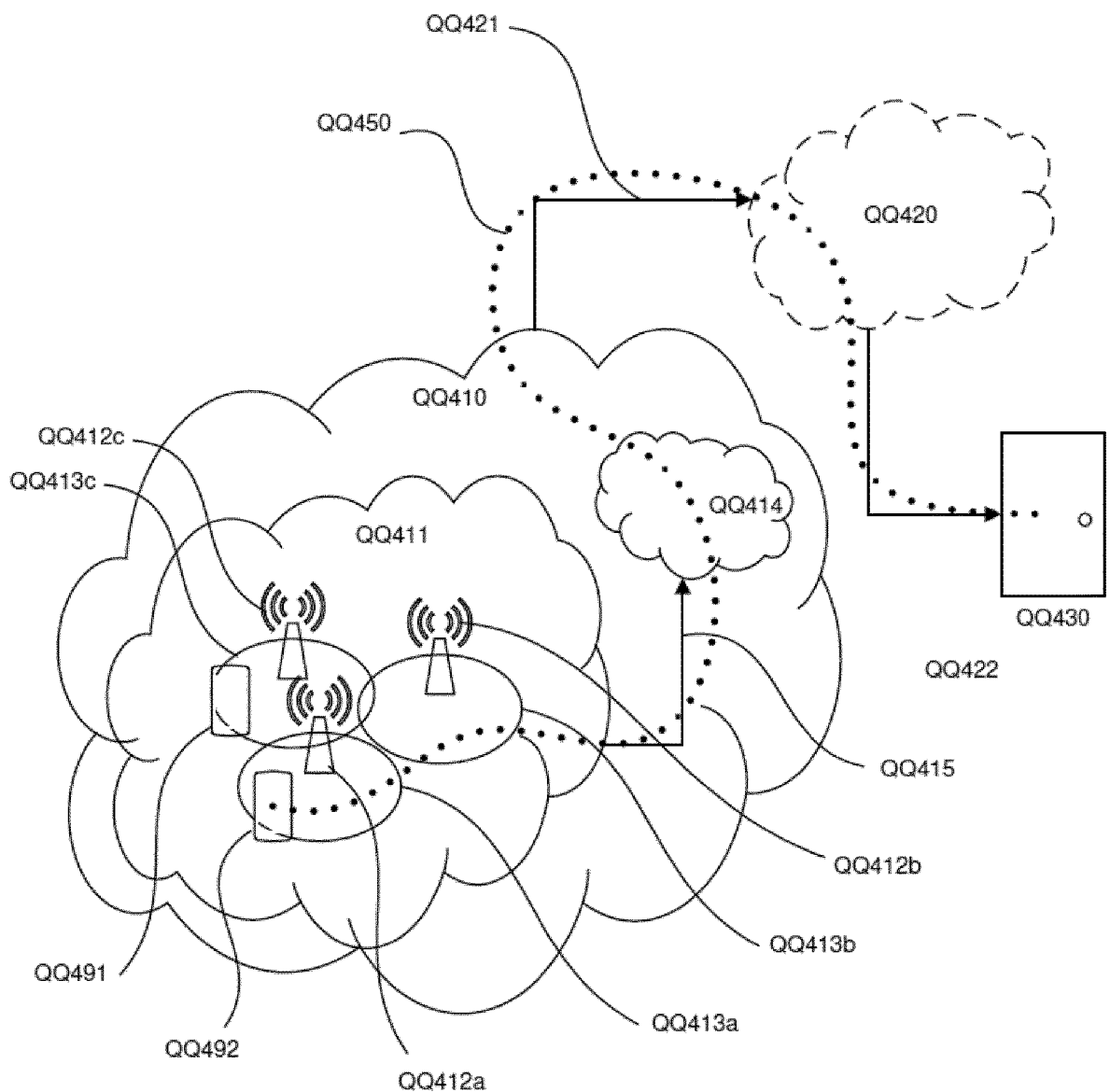
FIG. 22 is a block diagram of a telecommunication network connected via an intermediate network to a host computer in accordance with some embodiments.

FIG. 22: Telecommunication network connected via an intermediate network to a host computer in accordance with some embodiments.

With reference to FIG. 22, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 22 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 23:
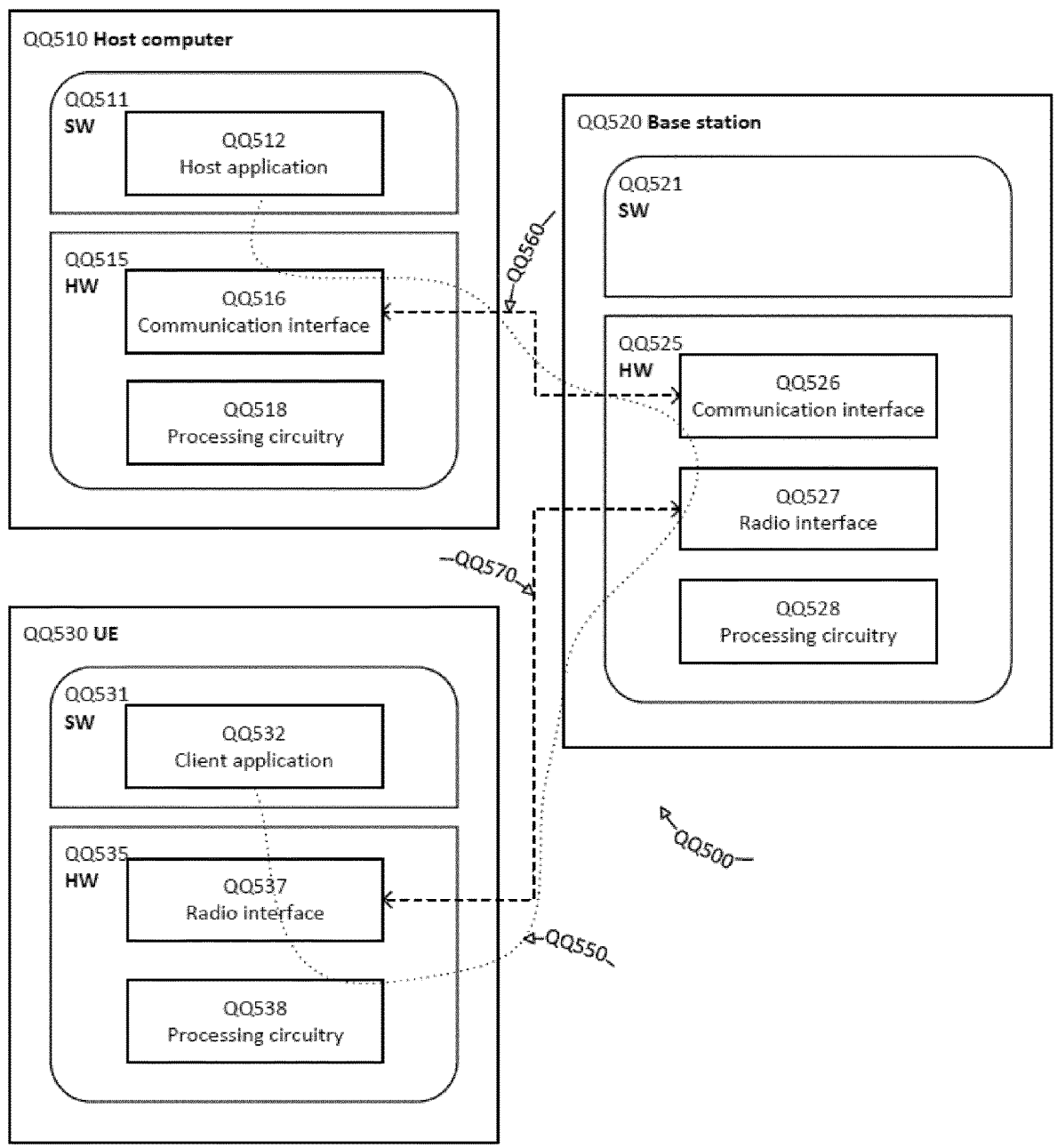
FIG. 23 is a block diagram of a host computer communicating via a base station with a user equipment over a partially wireless connection in accordance with some embodiments.

FIG. 23: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 23. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in Figure QQ5) served by base station QQ520. Communication interface QQ526 may be configured to facilitate connection QQ560 to host computer QQ510. Connection QQ560 may be direct or it may pass through a core network (not shown in Figure QQ5) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 23 may be similar or identical to host computer QQ430, one of base stations QQ412a, QQ412b, QQ412c and one of UEs QQ491, QQ492 of FIG. 22, respectively. This is to say, the inner workings of these entities may be as shown in FIG. 23 and independently, the surrounding network topology may be that of FIG. 22.

In FIG. 23, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 24:
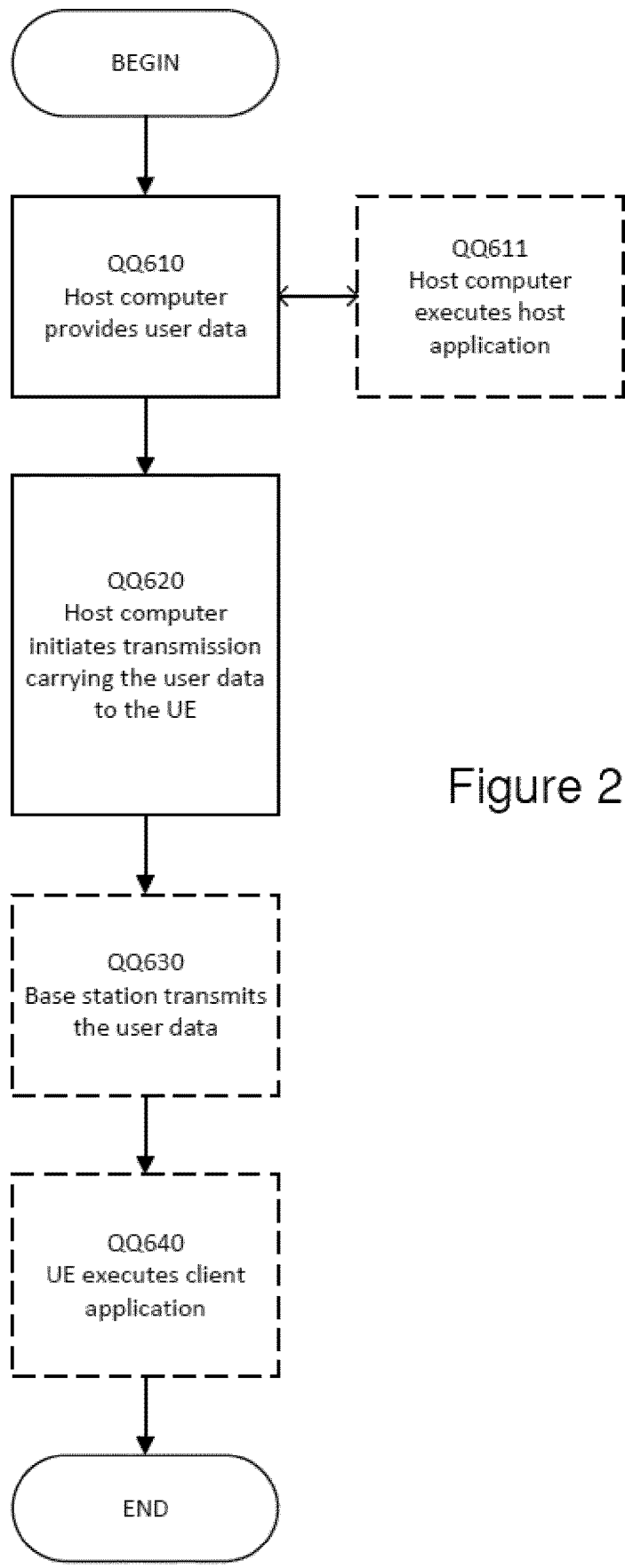
FIG. 24 is a block diagram of methods implemented in a communication system including a host computer, a base station and a user equipment in accordance with some embodiments.

FIG. 24: Methods implemented in a communication system including a host computer, a base station and a user equipment in accordance with some embodiments.

FIG. 24 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 24 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 25:
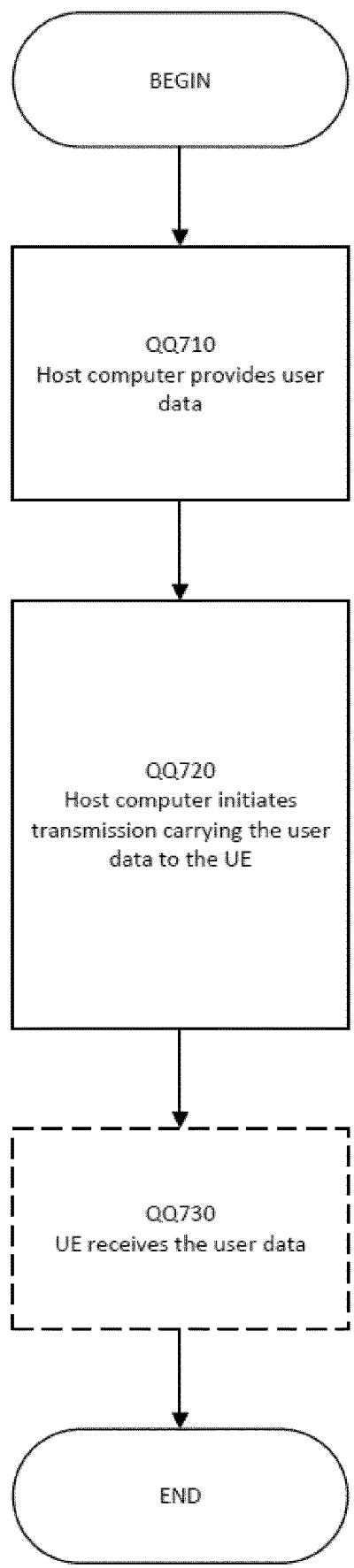
FIG. 25 is a block diagram of methods implemented in a communication system including a host computer, a base station and a user equipment in accordance with some embodiments.

FIG. 25: Methods implemented in a communication system including a host computer, a base station and a user equipment in accordance with some embodiments.

FIG. 25 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 25 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 26:
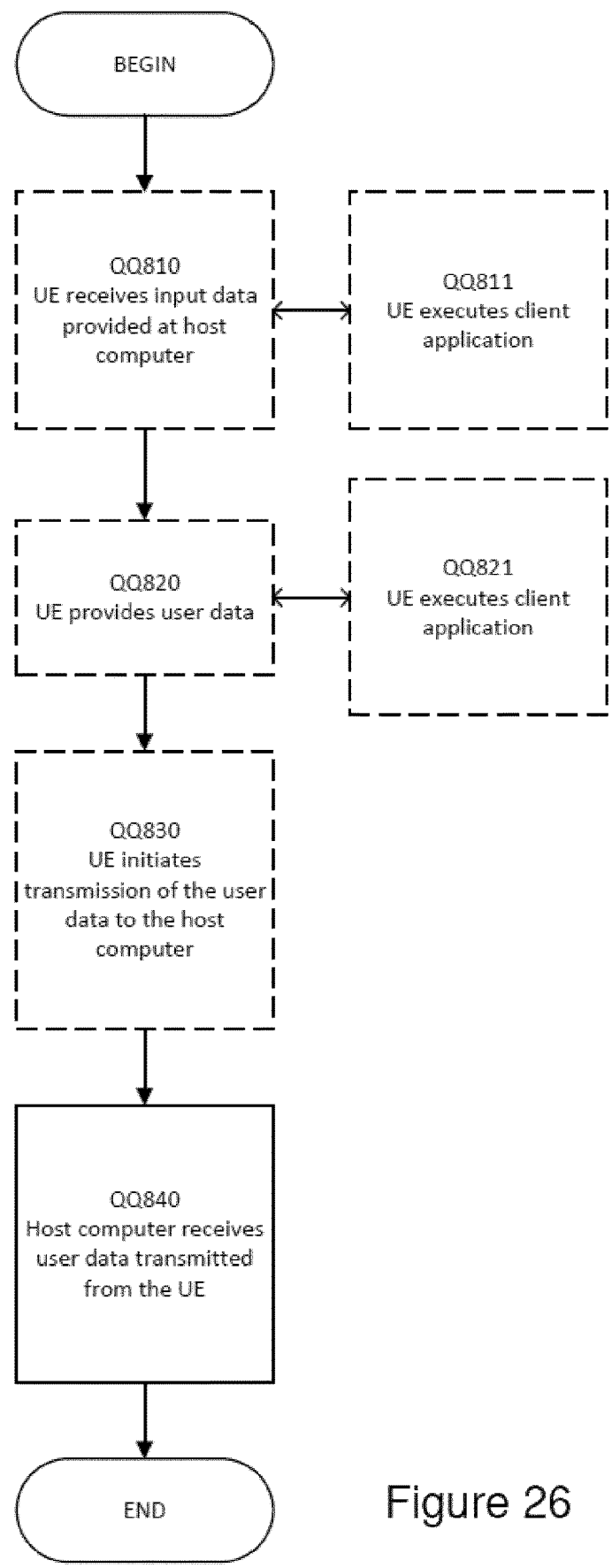
FIG. 26 is a block diagram of methods implemented in a communication system including a host computer, a base station and a user equipment in accordance with some embodiments.

FIG. 26: Methods implemented in a communication system including a host computer, a base station and a user equipment in accordance with some embodiments.

FIG. 26 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 26 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer.

In step QQ840 of the method, the host computer receives the user data transmitted from the UE, in accordance with the teachings of the embodiments described throughout this disclosure.

Figure 27:
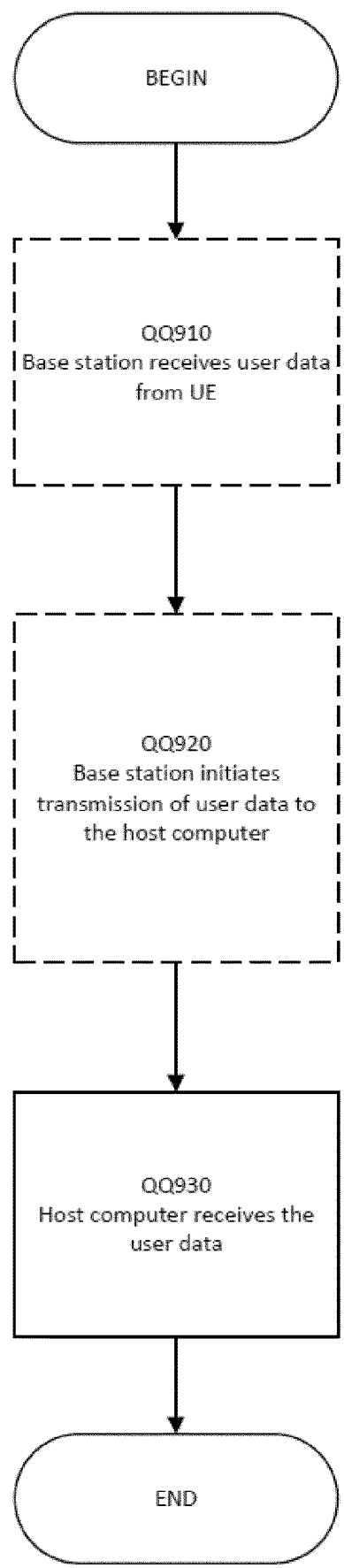
FIG. 27 is a block diagram of methods implemented in a communication system including a host computer, a base station and a user equipment in accordance with some embodiments.

FIG. 27: Methods implemented in a communication system including a host computer, a base station and a user equipment in accordance with some embodiments.

FIG. 27 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 27 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method performed by a user equipment (UE), the method comprising:
communicating with a first system via a radio access network;
receiving, from the first system, predefined dangerous zones that include a dangerous area, wherein receiving the predefined dangerous zones is performed using low priority data transfers for the user equipment to preload the predefined dangerous zones; and
increasing a frequency at which a Global Navigation Satellite System (GNSS) is accessed responsive to the user equipment entering the dangerous area, the dangerous area corresponding to an area that includes a vehicle operating therein, wherein an increase in GNSS access frequency provides an increased location data.

2. The method of claim 1, further comprising sending, to the first system, a request for radio resources to provide the increased location data relative to data that was provided before increasing the frequency at which the GNSS was accessed.

3. The method of claim 1, further comprising activating the dangerous area responsive to receiving a notification.

4. The method of claim 3, wherein the notification is received from a vehicle user equipment or wherein the notification is received from the first system.

5. The method of claim 1, further comprising sending a notification to a vehicle user equipment.

6. The method of claim 1, further comprising:
receiving, from the first system, a first configuration message corresponding to the dangerous area; and
activating the dangerous area and increasing a reporting granularity corresponding to a location of the user equipment in response to receiving the first configuration message.

7. The method of claim 1, further comprising:
receiving, from the first system, a second configuration message corresponding to the dangerous area; and
deactivating the dangerous area and decreasing a reporting granularity corresponding to a location of the user equipment in response to receiving the second configuration message.

8. The method of claim 1, further comprising the increasing the frequency that the global navigation satellite system (GNSS) is accessed is responsive to receiving a first configuration message.

9. The method of claim 8, further comprising decreasing a frequency that a GNSS is accessed responsive to receiving a second configuration message.

10. The method of claim 1, wherein a size of an activated portion of the predefined dangerous zones is based on a speed of the vehicle.

11. A user equipment (UE) comprising:
a transceiver that is configured to communicate with a first system via a radio access network; and
a processor that is coupled to the transceiver and that is configured to perform operations comprising:
receiving, from the first system, predefined dangerous zones that include a dangerous area, wherein receiving the predefined dangerous zones is performed using low priority data transfers for the user equipment to preload the predefined dangerous zones; and
increasing a frequency at which a Global Navigation Satellite System (GNSS) is accessed responsive to the user equipment entering the dangerous area, the dangerous area corresponding to an area that includes a vehicle operating therein,
wherein an increase in GNSS access frequency provides an increased location data.

12. A method performed by a network node, the method comprising:
communicating, using a first network application, with a user equipment, to cause the user equipment to activate a dangerous area and to increase a reporting granularity corresponding to a location of the user equipment, the dangerous area corresponding to an area that includes a vehicle operating therein, the reporting granularity is increased relative to a first reporting granularity, wherein the dangerous area is included in predefined dangerous zones provided to the user equipment via low priority data transfers for the user equipment to preload the predefined dangerous zones;

receiving, from the user equipment, location reporting data that is provided at the increased granularity; and
communicating, between the first network application and a second network application, a first notification that corresponds to determining that the user equipment is in the dangerous area, and the second network application is configured to send a vehicle notification to the vehicle to avoid a collision.

13. The method of claim 12, further comprising determining, by the first network application, coarse location data of the user equipment using network only measurements, wherein the network only measurements comprise: reference signal received power measurements from surrounding communication network cells or beamformed reference signals from one or more base stations.

14. A method performed by a first system, the method comprising:
sending, to a user equipment, predefined dangerous zones that include a dangerous area, wherein receiving the predefined dangerous zones are sent to the user equipment using low priority data transfers for the user equipment to preload the predefined dangerous zones; and
sending, to the user equipment, an activation notification that activates the dangerous area and causes the user equipment to increase a reporting granularity corresponding to a location of the user equipment, the dangerous area corresponding to an area that includes a vehicle operating therein, wherein the vehicle comprises a vulnerable road user (VRU) and the reporting granularity is increased relative to a first reporting granularity;
receiving, from the user equipment, location reporting data that is provided at the increased granularity; and
sending, to a second system, a first notification that corresponds to determining that the VRU will be in the dangerous area.

15. The method of claim 14, further comprising, before sending the first notification to the second system, anonymizing the first notification to remove VRU specific data therefrom, wherein an anonymized first notification is sent to the vehicle via the second system.

16. The method of claim 14, further comprising sending a second configuration message to the user equipment that causes the user equipment to deactivate a previously identified dangerous area and to decrease a reporting granularity corresponding to a location of the user equipment.

17. The method of claim 14, wherein a first configuration message further causes the user equipment to increase a frequency that the global navigation satellite system (GNSS) is accessed, and wherein the second configuration message further causes the user equipment to decrease a frequency that the Global Navigation Satellite System (GNSS) is accessed.

18. The method of claim 14, wherein sending, to the user equipment, the activation notification that activates the dangerous area is performed responsive to detecting that the user equipment is proximate the dangerous area and that conditions corresponding to activating the dangerous area are present, wherein conditions include information corresponding to the vehicle.

19. The method of claim 14, further comprising: sending a second configuration message to the user equipment that causes the user equipment to deactivate a previously identified dangerous area and to decrease a reporting granularity corresponding to a location of the user equipment in response to detecting that the user equipment is not proximate the dangerous area.

\* \* \* \* \*